United States Patent
Talbot et al.

(10) Patent No.: US 11,030,256 B2
(45) Date of Patent: Jun. 8, 2021

(54) METHODS AND USER INTERFACES FOR VISUALLY ANALYZING DATA VISUALIZATIONS WITH MULTI-ROW CALCULATIONS

(71) Applicant: Tableau Software, Inc., Seattle, WA (US)

(72) Inventors: Justin Talbot, Seattle, WA (US); Amy Nicole Forstrom, Seattle, WA (US); Daniel Cory, Seattle, WA (US); Christian Gabriel Eubank, Seattle, WA (US); Jeffrey Mark Booth, Jr., Seattle, WA (US); Nicolas Borden, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 16/675,122

(22) Filed: Nov. 5, 2019

(65) Prior Publication Data
US 2021/0133240 A1 May 6, 2021

(51) Int. Cl.
*G06F 16/904* (2019.01)
*G06F 16/901* (2019.01)
(Continued)

(52) U.S. Cl.
CPC .......... *G06F 16/904* (2019.01); *G06F 3/0483* (2013.01); *G06F 3/04842* (2013.01); *G06F 16/9027* (2019.01)

(58) Field of Classification Search
CPC .. G06F 16/904; G06F 16/9027; G06F 3/0483; G06F 3/04842
See application file for complete search history.

(56) References Cited

U.S. PATENT DOCUMENTS 5,511,186 A   4/1996   Carhart et al.
5,917,492 A   6/1999   Bereiter et al.
(Continued)

OTHER PUBLICATIONS

Milligan et al. (Tableau 10 Complete Reference. Copyright © 2018 Packt Publishing Ltd. ISBN 978-1-78995-708-2. Electronic edition excerpts retrieved on [Sep. 23, 2020] from [https://learning.oreilly.com/]. 144 pages. (Year: 2018).*

(Continued)

*Primary Examiner* — Amy M Levy
(74) *Attorney, Agent, or Firm* — Morgan, Lewis & Bockius LLP

(57) ABSTRACT

A user selects a data source, and a computer displays a data visualization in a data visualization user interface according to the data source. The data visualization includes visual data marks representing data from the data source. The user selects a subset of the visual data marks. In response, the computer displaying a view data window having a summary of the selected data marks. The computer obtains a data model encoding the data source as a tree of logical tables, each including one or more logical fields. Each logical field corresponds to either a data field or a calculation that spans one or more logical tables. Each edge of the tree connects two logical tables that are related. The computer identifies aggregate measures corresponding to the selected data marks, and displays each aggregate measure in the view data window.

20 Claims, 33 Drawing Sheets

(51) Int. Cl.
*G06F 3/0484* (2013.01)
*G06F 3/0483* (2013.01)

(56) References Cited

U.S. PATENT DOCUMENTS

| | | | |
|---|---|---|---|
| 6,199,063 | B1 | 3/2001 | Colby et al. |
| 6,212,524 | B1 | 4/2001 | Weissman et al. |
| 6,385,604 | B1 | 5/2002 | Bakalash et al. |
| 6,492,989 | B1 | 12/2002 | Wilkinson |
| 6,532,471 | B1 | 3/2003 | Ku et al. |
| 6,807,539 | B2 | 10/2004 | Miller et al. |
| 7,023,453 | B2 | 4/2006 | Wilkinson |
| 7,176,924 | B2 | 2/2007 | Wilkinson |
| 7,290,007 | B2 | 10/2007 | Farber et al. |
| 7,302,447 | B2* | 11/2007 | Dettinger ............ G06F 16/2452 707/714 |
| 7,337,163 | B1 | 2/2008 | Srinivasan et al. |
| 7,426,520 | B2 | 9/2008 | Gorelik et al. |
| 7,800,613 | B2 | 9/2010 | Hanrahan et al. |
| 7,941,521 | B1 | 5/2011 | Petrov et al. |
| 8,082,243 | B2 | 12/2011 | Gorelik et al. |
| 8,442,999 | B2 | 5/2013 | Gorelik et al. |
| 8,874,613 | B2 | 10/2014 | Gorelik et al. |
| 9,165,029 | B2* | 10/2015 | Bhoovaraghavan ........................ G06F 3/04842 |
| 9,336,253 | B2 | 5/2016 | Gorelik et al. |
| 9,563,674 | B2 | 2/2017 | Hou et al. |
| 9,613,086 | B1 | 4/2017 | Sherman |
| 9,710,527 | B1 | 7/2017 | Sherman |
| 9,779,150 | B1 | 10/2017 | Sherman et al. |
| 2001/0054034 | A1 | 12/2001 | Arning et al. |
| 2003/0023608 | A1 | 1/2003 | Egilsson et al. |
| 2004/0103088 | A1 | 5/2004 | Cragun et al. |
| 2004/0122844 | A1 | 6/2004 | Malloy et al. |
| 2004/0139061 | A1 | 7/2004 | Colossi et al. |
| 2004/0243593 | A1 | 12/2004 | Stolte et al. |
| 2005/0038767 | A1 | 2/2005 | Verschell et al. |
| 2005/0060300 | A1 | 3/2005 | Stolte et al. |
| 2005/0182703 | A1 | 8/2005 | D'hers et al. |
| 2006/0010143 | A1 | 1/2006 | Netz et al. |
| 2006/0167924 | A1 | 7/2006 | Bradlee et al. |
| 2006/0173813 | A1 | 8/2006 | Zorola |
| 2006/0206512 | A1 | 9/2006 | Hanrahan et al. |
| 2006/0294081 | A1 | 12/2006 | Dettinger et al. |
| 2007/0006139 | A1 | 1/2007 | Rubin et al. |
| 2007/0156734 | A1 | 7/2007 | Dipper et al. |
| 2008/0016026 | A1 | 1/2008 | Farber et al. |
| 2008/0027957 | A1* | 1/2008 | Bruckner ............... G06F 16/244 |
| 2009/0006370 | A1 | 1/2009 | Li et al. |
| 2009/0319548 | A1 | 12/2009 | Brown et al. |
| 2010/0005054 | A1 | 1/2010 | Smith et al. |
| 2010/0005114 | A1 | 1/2010 | Dipper |
| 2010/0077340 | A1 | 3/2010 | French et al. |
| 2011/0131250 | A1 | 6/2011 | Stolte et al. |
| 2012/0116850 | A1 | 5/2012 | Abe et al. |
| 2012/0117453 | A1 | 5/2012 | Mackinlay et al. |
| 2012/0284670 | A1* | 11/2012 | Kashik .................... G06F 3/048 715/848 |
| 2013/0080584 | A1 | 3/2013 | Benson |
| 2013/0159307 | A1 | 6/2013 | Wolge et al. |
| 2013/0191418 | A1 | 7/2013 | Martin, Jr. et al. |
| 2014/0181151 | A1* | 6/2014 | Mazoue .............. G06F 16/2452 707/792 |
| 2014/0189553 | A1 | 7/2014 | Bleizeffer et al. |
| 2015/0261728 | A1* | 9/2015 | Davis .................. G06F 16/9558 715/234 |
| 2015/0278371 | A1 | 10/2015 | Anand et al. |
| 2016/0092530 | A1* | 3/2016 | Jakubiak ................. G06F 16/26 715/202 |
| 2016/0092601 | A1* | 3/2016 | Lamas .................... G06F 16/25 707/722 |
| 2018/0024981 | A1* | 1/2018 | Xia ......................... G06F 40/18 715/215 |
| 2018/0129513 | A1* | 5/2018 | Gloystein ........... G06F 3/04842 |
| 2019/0065565 | A1* | 2/2019 | Stolte .................... G06F 3/0482 |
| 2020/0073876 | A1 | 3/2020 | Lopez et al. |
| 2020/0233905 | A1* | 7/2020 | Williams .............. G06F 16/221 |

OTHER PUBLICATIONS

Sleeper, Ryan (Practical Tableau. Copyright © 2018 Evolytics and Ryan Sleeper. Published by O'Reilly Media, Inc. ISBN 978-1-491-97731-6. Electronic edition excerpts retrieved on [Sep. 23, 2020] from [https://learning.oreilly.com/]. 101 pages. (Year: 2018).*

Tableau All Releases. retrieved on [Oct. 2, 2020] from [https://www.tableau.com/products/all-features]. 49 pages. (Year: 2020).*

Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article=1091&context-ece_etds, 87 pgs.

Gyldenege, Preinterview First Office Action, U.S. Appl. No. 16/221,413, dated Jun. 11, 2020, 4 pgs.

Gyldenege, First Action Interview Office Action, U.S. Appl. No. 16/221,413, dated Jul. 27, 2020, 4 pgs.

Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.

Morton, Office Action, U.S. Appl. No. 14/054,803, dated Sep. 11, 2015, 22 pgs.

Morton, Final Office Action, U.S. Appl. No. 14/054,803,dated May 11, 2016, 22 pgs.

Morton, Notice of Allowance, U.S. Appl. No. 14/054,803, dated Mar. 1, 2017, 23 pgs.

Morton, Preinterview 1st Office Action, U.S. Appl. No. 15/497,130, dated Sep. 18, 2019, 6 pgs.

Morton, First Action Interview Office Action, U.S. Appl. No. 15/497,130, dated Feb. 19, 2020, 26 pgs.

Morton, Final Office Action, U.S. Appl. No. 15/497,130, dated Aug. 12, 2020, 19 pgs.

Song et al., "SAMSTAR," Data Warehousing and OLAP, ACM, 2 Penn Plaza, Suite 701, New York, NY, Nov. 9, 2007, XP058133701, pp. 9 to 16, 8 pgs.

Tableau Software, Inc., International Search Report and Written Opinion, PCTUS2019056491, dated Jan. 2, 2020, 11 pgs.

Tableau Software, Inc., International Search Report and Written Opinion, PCTUS2018/044878, dated Oct. 22, 2018, 15 pgs.

Tableau Software, Inc., International Preliminary Report on Patentability, PCTUS2018/044878, dated Apr. 14, 2020, 12 pgs.

Talbot, Office Action, U.S. Appl. No. 14/801,750, dated May 7, 2018, 60 pgs.

Talbot, Final Office Action, U.S. Appl. No. 14/801,750, dated Nov. 28, 2018, 63 pgs.

Talbot, Office Action, U.S. Appl. No. 14/801,750, dated Jun. 24, 2019, 55 pgs.

Talbot, Preinterview First Office Action, U.S. Appl. No. 15/911,026, dated Jun. 9, 2020, 6 pgs.

Talbot, First Action Interview Office Action, U.S. Appl. No. 15/911,026, dated Jul. 22, 2020, 6 pgs.

Weir, Office Action, U.S. Appl. No. 16/679,233, dated Oct. 1, 2020, 9 pgs.

* cited by examiner

Example View Data Summary (Desktop Version) 142

View Data: Sheet 1

☑ Show alises

| Category | Sub-Category | Sales |
|---|---|---|
| Furniture | Chairs | $328,449 |
| Office Supplies | Storage | $223,844 |
| Technology | Phones | $330,007 |

Summary | Full Data 3 rows

Example View Data Full Data Details (Desktop Version) 144

View Data: Sheet 1

2352 ⇨ ☑ Show aliases ☑ Show all fields    Copy   Export All

| Category | City | Country | Customer Name | Manufacturer | Order Date | Order ID |
|---|---|---|---|---|---|---|
| Furniture | Henderson | United States | Claire Gute | Hon | 11/8/2016 | CA-2016-1521 |
| Office Supplies | Fort Lauderdale | United States | Sean O'Donnell | Eldon | 10/11/2015 | US-2015-1089 |
| Technology | Los Angeles | United States | Brosina Hoffman | Mitel | 6/9/2014 | CA-2014-1158 |
| Technology | Los Angeles | United States | Brosina Hoffman | Other | 6/9/2014 | CA-2014-1158 |
| Office Supplies | Madison | United States | Pete Kriz | Other | 11/11/2014 | CA-2014-1058 |
| Office Supplies | West Jordan | United States | Alejandro Grove | Fellowes | 5/13/2014 | CA-2014-1671 |
| Technology | San Francisco | United States | Zuschuss Donatelli | Cisco | 8/27/2014 | CA-2014-1433 |
| Furniture | Philadelphia | United States | Sandra Flanagan | Global | 7/16/2017 | US-2017-1569 |
| Technology | Richardson | United States | Gene Hale | GE | 12/8/2016 | CA-2016-1175 |
| Furniture | Houston | United States | Steve Nguyen | Global | 12/27/2015 | CA-2015-1174 |
| Furniture | Houston | United States | Steve Nguyen | Plantronics | 12/27/2015 | CA-2015-1174 |
| Technology | Naperville | United States | Linda Cazamias | Panasonic | 9/10/2017 | CA-2017-1209 |
| Office Supplies | Los Angeles | United States | Rubein Ausman | Eldon | 7/17/2016 | CA-2016-1013 |
| Office Supplies | Melbourne | United States | Erin Smith | Adcantus | 9/19/2017 | CA-2017-1396 |
| Office Supplies | Westland | United States | Patrick O'Donnell | Gould Plastics | 10/20/2014 | CA-2014-1467 |

Summary | Full Data 2,352 rows 143   145

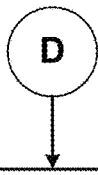

840 — In accordance with a determination that a plurality of aggregate measures is aggregated from a same set of logical tables, display only a single instance of the plurality of aggregate measures in the view data window.

Figure 8E

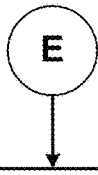

842 — In accordance with a determination that a plurality of aggregate measures is aggregated from a first logical table, (i) cease to display the plurality of aggregate measures, and (ii) display the first logical table, in the view data window.

Figure 8F

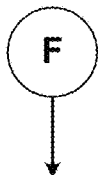

844 — Display, in the view data window, dimensions and calculations referenced in the selected subset of visual data marks.

846 — Display, in the view data window, one or more measures for each calculation referenced in the selected subset of visual data marks.

Figure 8G

METHODS AND USER INTERFACES FOR VISUALLY ANALYZING DATA VISUALIZATIONS WITH MULTI-ROW CALCULATIONS

RELATED APPLICATIONS

This application is related to U.S. patent application Ser. No. 16/236,611, filed Dec. 30, 2018, entitled "Generating Data Visualizations According to an Object Model of Selected Data Sources," which claims priority to U.S. Provisional Patent Application No. 62/748,968, filed Oct. 22, 2018, entitled "Using an Object Model of Heterogeneous Data to Facilitate Building Data Visualizations," each of which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 15/911,026, filed Mar. 2, 2018, entitled "Using an Object Model of Heterogeneous Data to Facilitate Building Data Visualizations," which claims priority to U.S. Provisional Patent Application 62/569,976, filed Oct. 9, 2017, "Using an Object Model of Heterogeneous Data to Facilitate Building Data Visualizations," each of which is incorporated by reference herein in its entirety.

This application is also related to U.S. patent application Ser. No. 14/801,750, filed Jul. 16, 2015, entitled "Systems and Methods for using Multiple Aggregation Levels in a Single Data Visualization," and U.S. patent application Ser. No. 15/497,130, filed Apr. 25, 2017, entitled "Blending and Visualizing Data from Multiple Data Sources," which is a continuation of U.S. patent application Ser. No. 14/054,803, filed Oct. 15, 2013, entitled "Blending and Visualizing Data from Multiple Data Sources," now U.S. Pat. No. 9,633,076, which claims priority to U.S. Provisional Patent Application No. 61/714,181, filed Oct. 15, 2012, entitled "Blending and Visualizing Data from Multiple Data Sources," each of which is incorporated by reference herein in its entirety.

This application is also related to U.S. patent application Ser. No. 16/570,969, filed Sep. 13, 2019, entitled "Utilizing Appropriate Measure Aggregation for Generating Data Visualizations of Multi-fact Datasets," which is incorporated by reference herein in its entirety.

TECHNICAL FIELD

The disclosed implementations relate generally to data visualization and more specifically to interactive visual analysis of a data set using an object model of the data set.

BACKGROUND

Data visualization applications enable a user to understand a data set visually, including distribution, trends, outliers, and other factors that are important to making business decisions. Some data elements must be computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations.

Some data visualization applications provide a user interface that enables users to build visualizations from a data source by selecting data fields and placing them into specific user interface regions to indirectly define a data visualization. See, for example, U.S. patent application Ser. No. 10/453,834, filed Jun. 2, 2003, entitled "Computer Systems and Methods for the Query and Visualization of Multidimensional Databases," now U.S. Pat. No. 7,089,266, which is incorporated by reference herein in its entirety. However, when there are complex data sources and/or multiple data sources, it may be unclear what type of data visualization to generate (if any) based on a user's selections.

In addition, some systems construct queries that yield data visualizations that are not what a user expects. In some cases, some rows of data are omitted (e.g., when there is no corresponding data in one of the fact tables). These problems can be particularly problematic because an end user may not be aware of the problem and/or not know what is causing the problem.

SUMMARY

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once a class model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

In accordance with some implementations, a method facilitates visualization of object models for data sources. The method is performed at a computer having a display, one or more processors, and memory. The memory stores one or more programs configured for execution by the one or more processors. The computer receives user selection of a data source. In response, the computer displays a data visualization in a data visualization user interface, according to placement of data fields, from the data source, in shelves of the user interface. The data visualization includes a plurality of visual data marks representing data from the data source. The computer detects a first user input to select a subset of the visual data marks. In response to detecting the first user input, the computer displays a view data window, including a summary of the selected subset of visual data marks. The computer also obtains a data model encoding the data source as a tree of logical tables. Each logical table has its own physical representation and includes a respective set of one or more logical fields. Each logical field corresponds to either a data field or a calculation that spans one or more logical tables. Each edge of the tree connects two logical tables that are related, and each data field is either a measure or a dimension. The computer also determines, based on the data model, one or more aggregate measures corresponding to the selected subset of visual data marks. Each aggregate measure is aggregated from a plurality of logical tables of the data model. The computer displays each aggregate measure of the one or more aggregate measures in the view data window.

In some implementations, in response to detecting the first user input, the computer visually highlights the selected subset of the visual data marks.

In some implementations, the view data window is displayed as a side panel or a pop up window.

In some implementations, each aggregate measure is displayed as a tab in the view data window.

In some implementations, the computer also displays each aggregate measure according to its disaggregated level of detail. In some implementations, the computer also displays one or more dimensions referenced in the one or more aggregate measures in the data visualization. In some implementations, the computer orders the one or more dimensions according to a visual specification.

In some implementations, the computer also detects a second user input to show data fields of a respective aggregate measure. In response to detecting the second user input, the computer displays data fields for the respective aggregate measure.

In some implementations, in accordance with a determination that a plurality of aggregate measures is aggregated from a same set of logical tables, the computer displays only a single instance of the plurality of aggregate measures in the view data window.

In some implementations, in accordance with a determination that a plurality of aggregate measures is aggregated from a first logical table, the computer: (i) ceases to display the plurality of aggregate measures, and (ii) displays the first logical table, in the view data window.

In some implementations, the computer displays, in the view data window, dimensions and calculations referenced in the selected subset of visual data marks. In some implementations, the computer also displays, in the view data window, one or more measures for each calculation referenced in the selected subset of visual data marks.

In some implementations, the computer displays, in the view data window, one or more level of detail calculations referenced in the selected subset of visual data marks. In some implementations, the computer displays level of detail calculations that have a Fixed calculation type and that have dimensions that come from a single logical table using the single logical table. In some implementations, the computer separately displays level of detail calculations that have calculation types other than Fixed. In some implementations, each level of detail calculation that references more than one logical table is displayed using its corresponding Least Common Ancestor (LCA) logical table.

In some implementations, the computer displays, in the view data window, a respective label or a name to identify each aggregate measure.

In accordance with some implementations, a system for facilitating visualization of object models for data sources includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 1C illustrates an example view of summary of aggregated data for the fields shown in the data visualization in FIG. 1B, in accordance with some implementations.

FIG. 1D illustrates an example view of data for selected marks in the data visualization in FIG. 1B, in accordance with some implementations.

FIGS. 4A-4G, 5A-5D, 6, and 7A-7I are screen shots of a user interface for generating data visualizations using an object model, according to some implementations.

FIGS. 8A-8I provide a flowchart of a method for generating data visualizations using an object model, in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
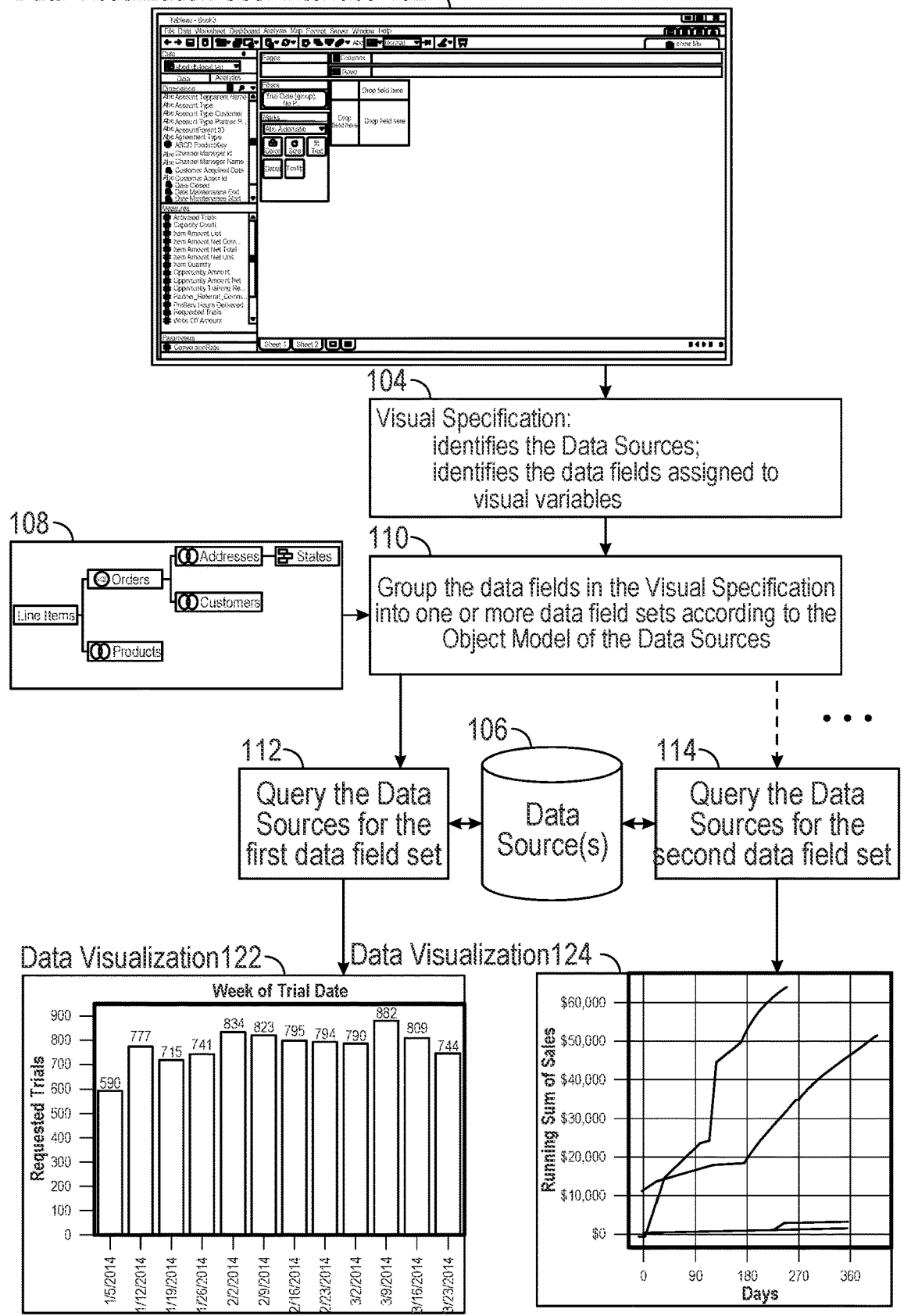
FIG. 1A illustrates conceptually a process of building a data visualization in accordance with some implementations.

Some implementations of an interactive data visualization application use a data visualization user interface 102 to build a visual specification 104, as shown in FIG. 1A. The visual specification identifies one or more data sources 106, which may be stored locally (e.g., on the same device that is displaying the user interface 102) or may be stored externally (e.g., on a database server or in the cloud). The visual specification 104 also includes visual variables. The visual variables specify characteristics of the desired data visualization indirectly according to selected data fields from the data sources 106. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. In some cases, the many-to-one relationships are illustrated with arrows, with the "many" side of each relationship pointing to the "one" side of the relationship. The object model also identifies each of the data fields (attributes) as either a dimension or a measure. In the following, the letter "D" (or "d") is used to represent a dimension, whereas the latter "M" (or "m") is used to represent a measure. Dimensions are categorical data fields that store discrete values (e.g., data fields with string data types). Measures are typically numeric data fields, which can be aggregated (e.g., but summing or computing an average). When an object model 108 is constructed, it can facilitate building data visualizations based on the data fields a user selects. Because a single object model can be used by an unlimited number of other people, building the object model for a data source is commonly delegated to a person who is a relative expert on the data source, Referring next to FIGS. 2 and 3, as a user adds data fields to the visual specification (e.g., indirectly by using the graphical user interface to place data fields onto shelves), the data visualization application 222 (or web application 322) groups (110) together the user-selected data fields according to the object model 108. Such groups are called data field sets 294. In many cases, all of the user-selected data fields are in a single data field set 294. In some instances, there are two or more data field sets 294. Each measure m is in exactly one data field set 294, but each dimension d may be in more than one data field set 294.

The data visualization application 222 (or web application 322) queries (112) the data sources 106 for the first data field set 294, and then generates a first data visualization 122 corresponding to the retrieved data. The first data visualization 122 is constructed according to the visual variables 282 in the visual specification 104 that have assigned data fields 284 from the first data field set 294. When there is only one data field set 294, all of the information in the visual specification 104 is used to build the first data visualization 122. When there are two or more data field sets 294, the first data visualization 122 is based on a first visual sub-specification consisting of all information relevant to the first data field set 294. For example, suppose the original visual specification 104 includes a filter that uses a data field f. If the field f is included in the first data field set 294, the filter is part of the first visual sub-specification, and thus used to generate the first data visualization 122.

When there is a second (or subsequent) data field set 294, the data visualization application 222 (or web application 322) queries (114) the data sources 106 for the second (or subsequent) data field set 294, and then generates the second (or subsequent) data visualization 124 corresponding to the retrieved data. This data visualization 124 is constructed according to the visual variables 282 in the visual specification 104 that have assigned data fields 284 from the second (or subsequent) data field set 294.

Figure 1B:
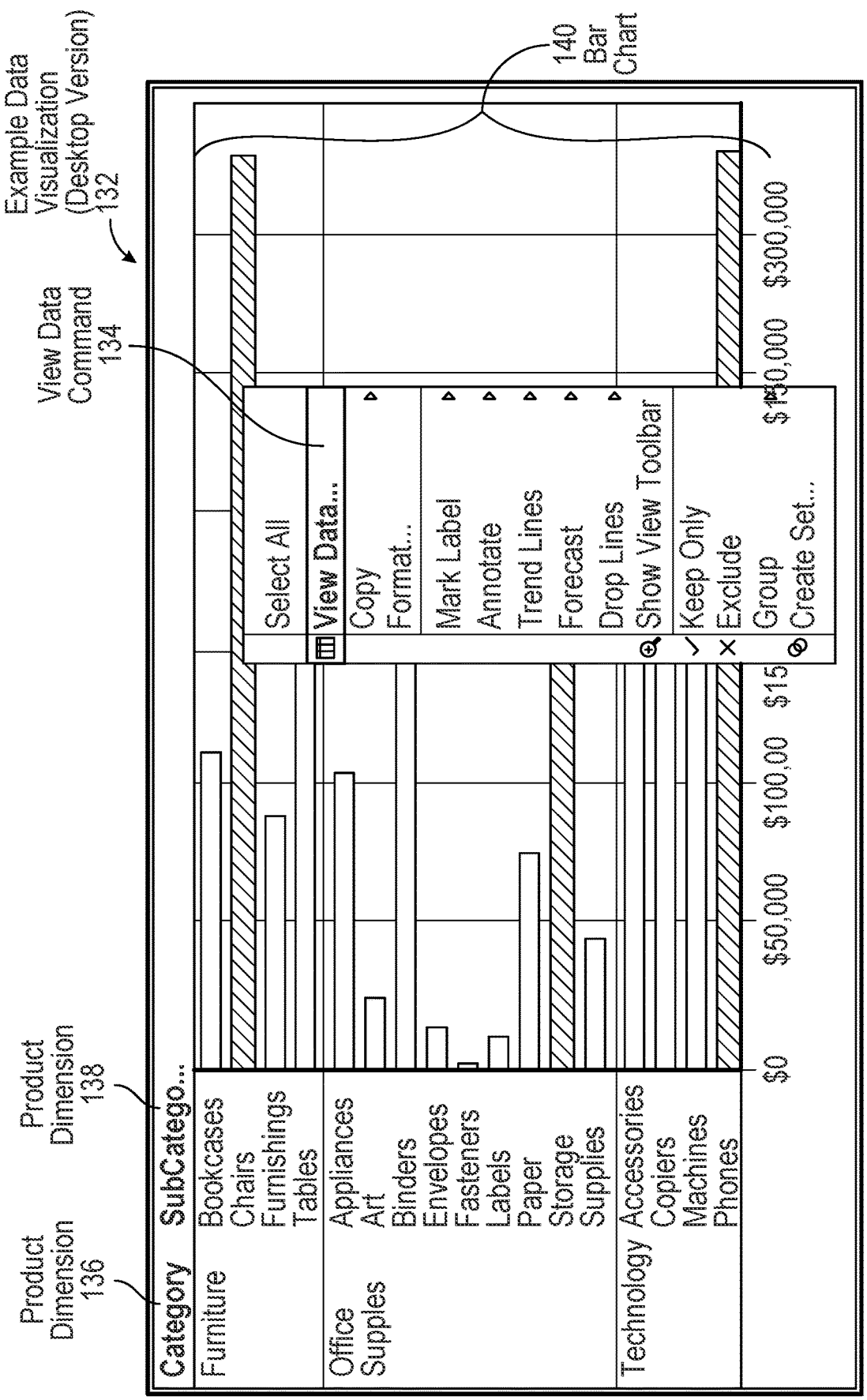
FIG. 1B illustrates a desktop version of an example data visualization, in accordance with some implementations.

FIG. 1B illustrates a desktop version 132 of an example data visualization, in accordance with some implementations. The example shows a view data command 134 that a user can use to display the values for all rows in a data source that underlie a set of marks in the view. The view data command also allows the user to view summary data based on the aggregations in the view. In some implementations, the view data command enables the user to verify the aggregated value associated with a mark, or to isolate and export individual rows associated with data of interest, such as outliers. Some implementations allow a user to view data for a selection of marks, for the fields in a data pane, or when the user is connecting to data. In some implementations, the view data command works in conjunction with relational and multi-dimensional databases. In some implementations, the database is drill-through enabled. Some implementations support viewing multi-dimensional data sources in desktop versions of a data visualization software.

Returning to the example view shown in FIG. 1B, sales for two product dimensions (Category 136 and Sub-Category 138) are displayed as a bar chart 140. Suppose a user wants to view data for the largest marks in each pane. In some implementations (e.g., the desktop version), the user selects the marks, right-clicks (or control-clicks) in the view, and selects 'View Data' on the context menu. Alternatively, a user selects Analysis, then selects the View Data menu item. In some implementations (e.g., online or server versions), the user selects the marks and clicks 'View Data' on the Tooltip menu.

FIG. 1C illustrates an example view 142 of a summary of aggregated data for the fields shown in the data visualization in FIG. 1B, in accordance with some implementations. In the example shown, summarized data is shown in a 'Summary' tab 141. In some implementations, summarized data is provided as a text table of the aggregated data for the fields shown in the view.

FIG. 1D illustrates an example view 144 of data for selected marks in the data visualization in FIG. 1B, in accordance with some implementations. In some implementations, data for the selected marks is displayed in a 'Full Data' tab 143. In some implementations, the lower right of the dialog box shows the number 145 of rows in the underlying data. In some implementations, when using data blending, the Full Data tab shows only the data from the primary data source.

Figure 1E:
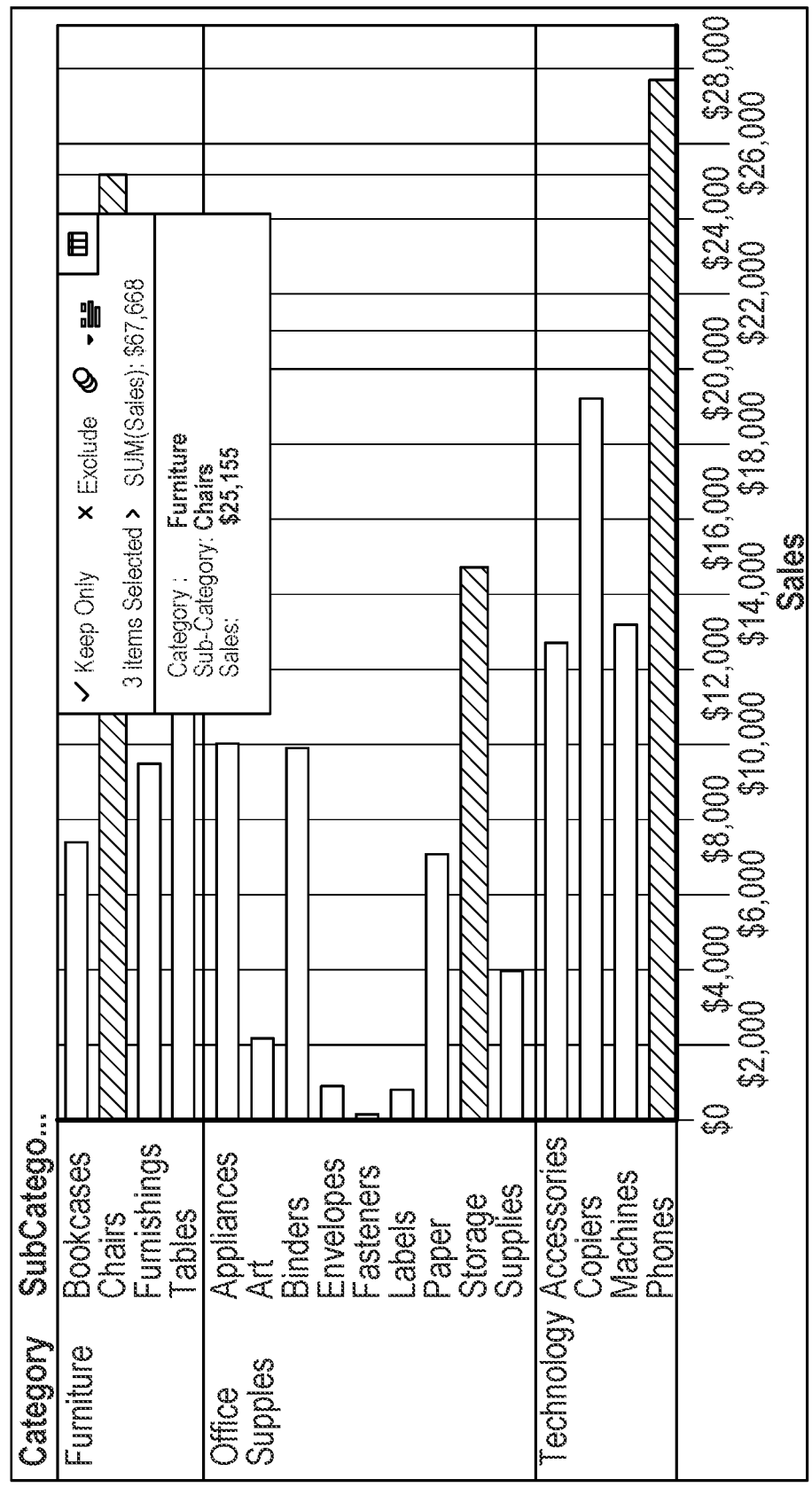
FIG. 1E illustrates a web version of the example data visualization in FIG. 1B, in accordance with some implementations.
Figure 1F:
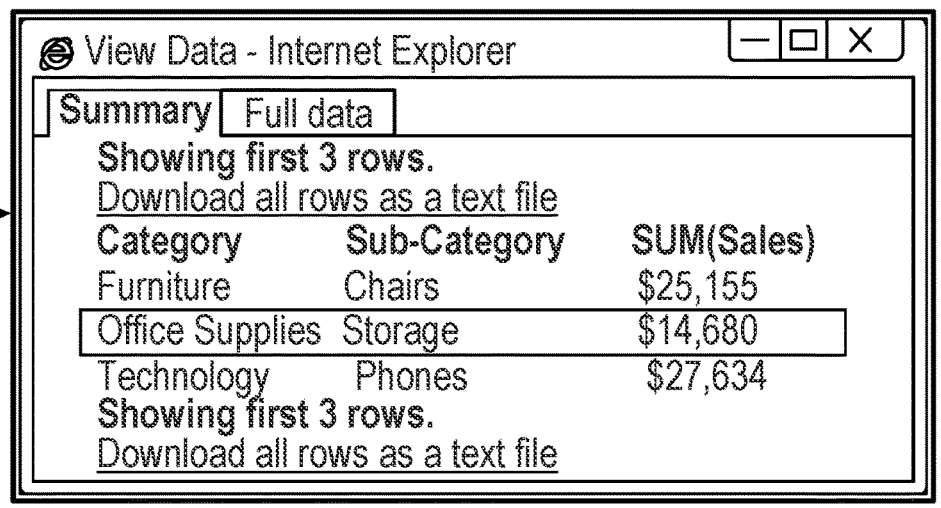
FIG. 1F illustrates an example view of summary of aggregated data for the fields shown in the data visualization in FIG. 1E, in accordance with some implementations.
Figure 1G:
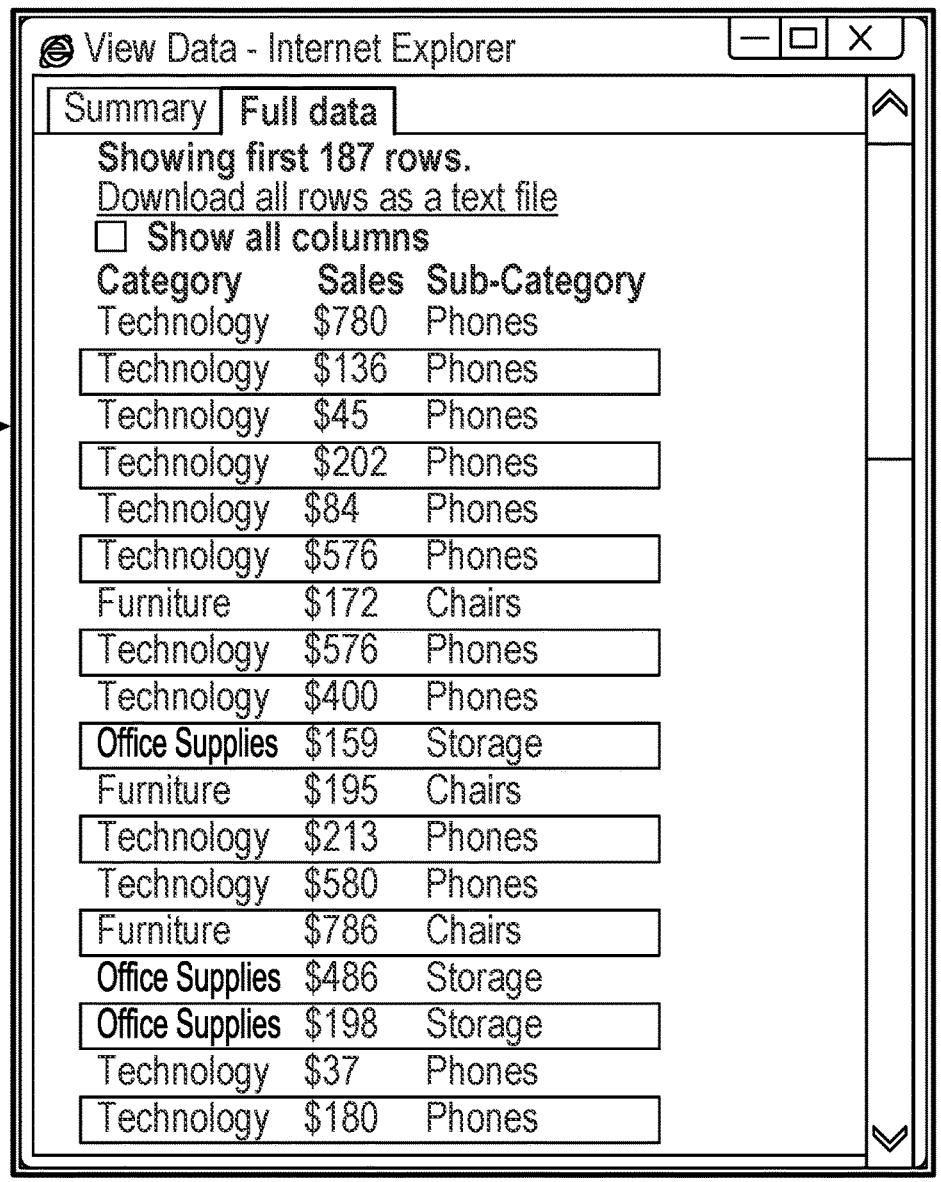
FIG. 1G illustrates an example view of data for selected marks in the data visualization in FIG. 1E, in accordance with some implementations.

FIG. 1E illustrates a web version 146 of the example data visualization in FIG. 1B, in accordance with some implementations. FIG. 1F illustrates an example view 148 of summary of aggregated data for the fields shown in the data visualization in FIG. 1E, in accordance with some implementations. FIG. 1G illustrates an example view 150 of data for selected marks in the data visualization in FIG. 1E, in accordance with some implementations.

Figure 2:
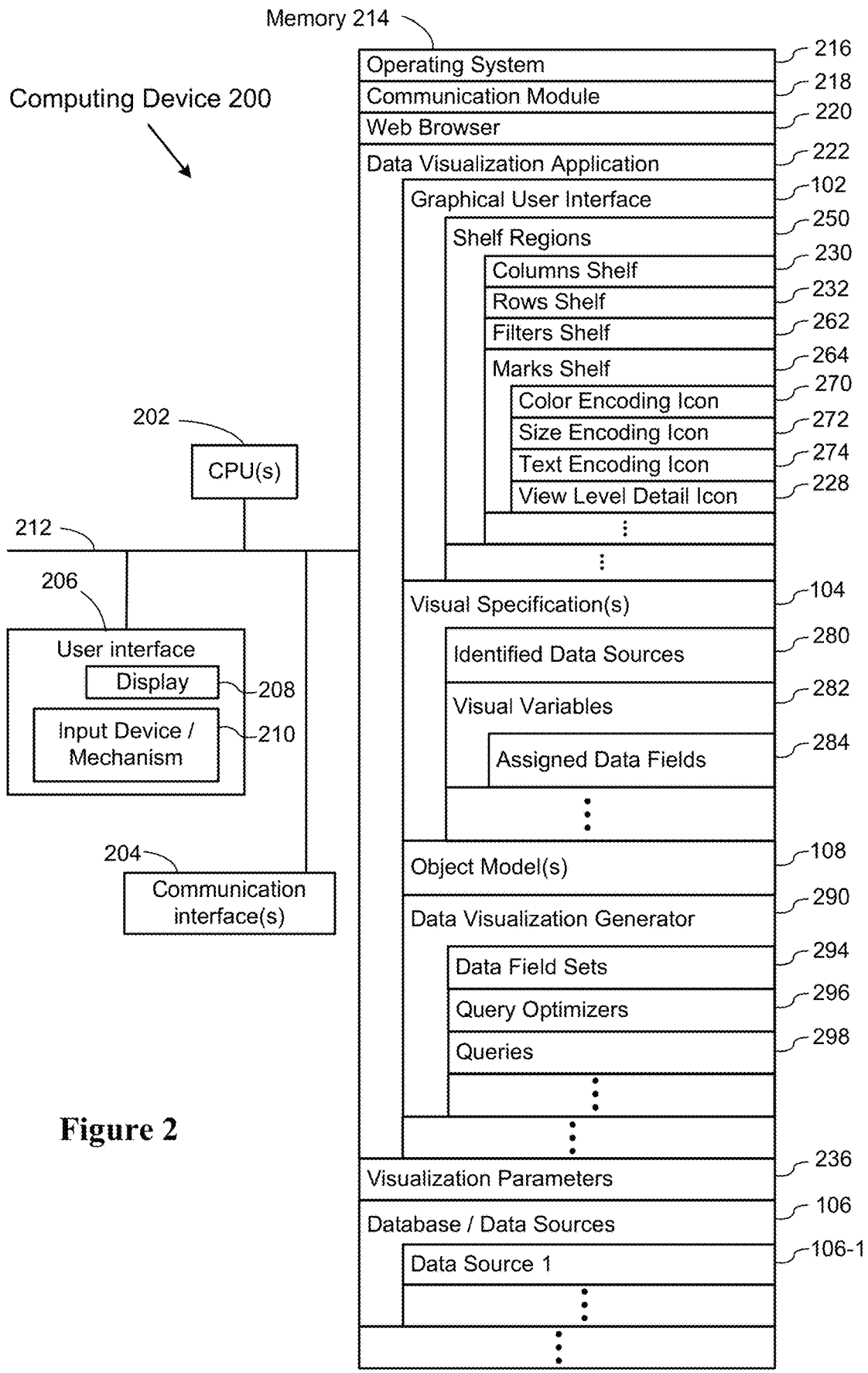
FIG. 2 is a block diagram of a computing device according to some implementations.

FIG. 2 is a block diagram illustrating a computing device 200 that can execute the data visualization application 222 or the data visualization web application 322 to display a data visualization 122. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard. In some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which enables a user to build a data visualization by specifying elements visually, as illustrated in FIG. 4 below;
- in some implementations, the user interface 102 includes a plurality of shelf regions 250, which are used to specify characteristics of a desired data visualization. In some implementations, the shelf regions 250 include a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks). In some implementations, the shelf regions 250 include a filters shelf 262, which enables a user to limit the data viewed according to a selected data field (e.g., limit the data to rows for which a certain field has a specific value or has values in a specific range). In some implementations, the shelf regions 250 include a marks shelf 264, which is used to specify various encodings of data marks. In some implementations, the marks shelf 264 includes a color encoding icon 270 (to specify colors of data marks based on a data field), a size encoding icon 272 (to specify the size of data marks based on a data field), a text encoding icon (to specify labels associated with data marks), and a view level detail icon 228 (to specify or modify the level of detail for the data visualization);
- visual specifications 104, which are used to define characteristics of a desired data visualization. In some implementations, a visual specification 104 is built using the user interface 102. A visual specification includes identified data sources 280 (i.e., specifies what the data sources are), which provide enough information to find the data sources 106 (e.g., a data source name or network full path name). A visual specification 104 also includes visual variables 282, and the assigned data fields 284 for each of the visual variables. In some implementations, a visual specification has visual variables corresponding to each of the shelf regions 250. In some implementations, the visual variables include other information as well, such as context information about the computing device 200, user preference information, or other data visualization features that are not implemented as shelf regions (e.g., analytic features);
- one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

a data visualization generator 290, which generates and displays data visualizations according to visual specifications. Selected data fields are grouped into one or more data field sets 294, as illustrated in FIG. 1A. In accordance with some implementations, the data visualization generator 290 uses an object model 108 to generate queries 298 and/or optimize queries using query optimizers 296. The details of the query generation and optimization techniques are described below in reference to FIGS. 5A-11, according to some implementations;

visualization parameters 236, which contain information used by the data visualization application 222 other than the information provided by the visual specifications 104 and the data sources 106; and zero or more databases or data sources 106 (e.g., a first data source 106-1), which are used by the data visualization application 222. In some implementations, the data sources are stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
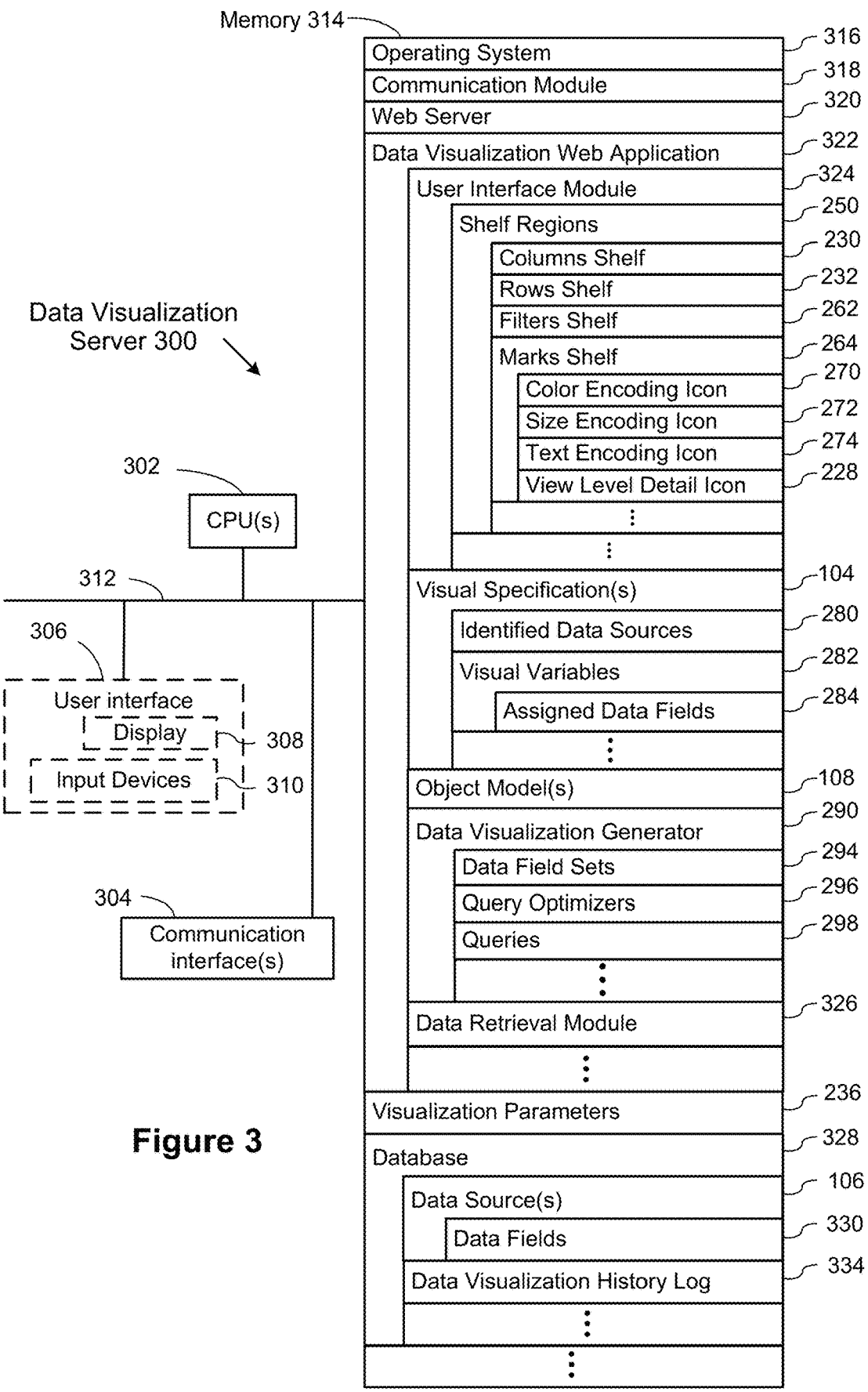
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the user interface module 324 specifies shelf regions 250, as described above for a computing device 200;

the data visualization web application also stores visual specifications 104 as a user selects characteristics of the desired data visualization. Visual specifications 104, and the data they store, are described above for a computing device 200;

one or more object models 108, as described above for a computing device 200;

a data visualization generator 290, which generates and displays data visualizations according to user-selected data sources and data fields, as well as one or more object models that describe the data sources 106. The operation of the data visualization generator is described above with respect to a computing device 200;

in some implementations, the web application 322 includes a data retrieval module 326, which builds and executes queries to retrieve data from one or more data sources 106. The data sources 106 may be stored locally on the server 300 or stored in an external database. In some implementations, data from two or more data sources may be blended. In some implementations, the data retrieval module 326 uses a visual specification 104 to build the queries, as described above for the computing device 200 in FIG. 2;

in some implementations, the memory 314 stores visualization parameters 236, as described above for a computing device 200;

one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences. In some implementations, the database 328 includes a data visualization history log 334. In some implementations, the history log 334 tracks each time the data visualization web application 322 renders a data visualization.

The databases 328 may store data in many different formats, and commonly include many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIGS. 4A-4G, 5A-5D, 6, and 7A-7I are screen shots of a user interface for generating data visualizations using an object model, according to some implementations.

Figure 4A:
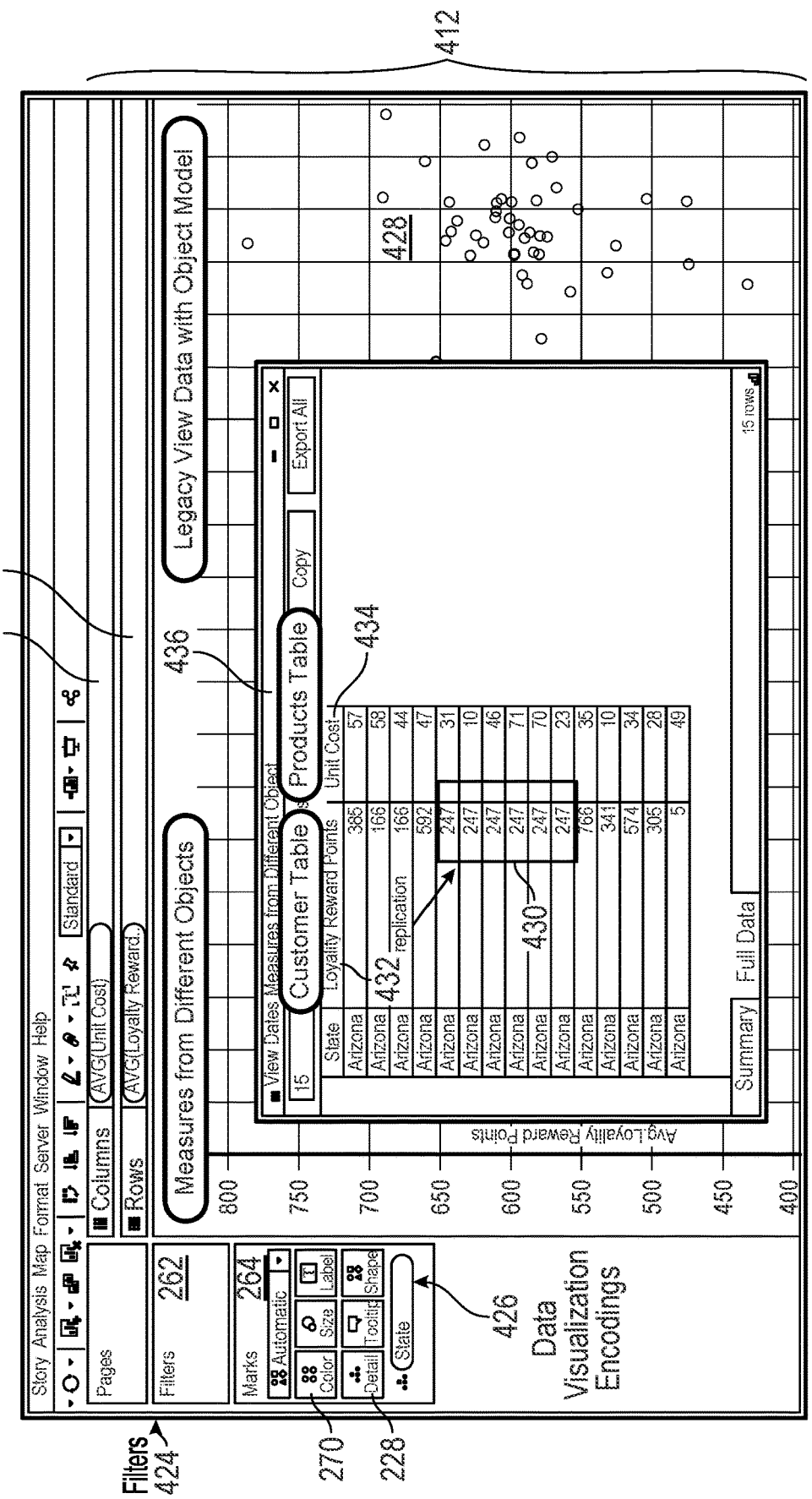

FIG. 4A shows a data visualization user interface 102 in accordance with some implementations. In some implementations, the user interface 102 includes a schema information region, which is also referred to as a data pane. The schema information region provides named data elements (e.g., field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions, such as a columns shelf region 230 and a rows shelf region 232. These are also referred to as the column shelf 230 and the row shelf 232. In addition, this user interface 102 includes a filters shelf 262, which may include one or more filters 424.

As illustrated here, the data visualization region 412 also has a large space for displaying a visual graphic. In FIG. 4A, the displayed visual graphic 428 is a scatterplot.

A user selects one or more data sources 106 (which may be stored on the computing device 200 or stored remotely), selects data fields from the data source(s), and uses the selected fields to define a visual graphic. The data visualization application 222 (or web application 322) displays the generated graphic 428 in the data visualization region 412. In some implementations, the information the user provides is stored as a visual specification 104.

In some implementations, the data visualization region 412 includes a marks shelf 264. The marks shelf 264 allows a user to specify various encodings 426 of data marks. In some implementations, the marks shelf includes one or more icons (e.g., a color encoding icon 270, a size encoding icon 272, a text encoding icon 274, and a view level detail icon 228, which can be used to specify or modify the level of detail for the data visualization).

In some implementations, data visualization platforms enable users to build visualizations through drag and drop actions using one or more logical tables. Users construct a logical table through physical modeling, which can include pivots, joins, and unions. Tables combined through physical modeling represent logical tables themselves. In some data visualization platforms, a query generation model automatically maps user actions to underlying queries. In some implementations, an analyst creates an object model for a data set.

With object models, underlying data for a visualization can come from more than one logical table. Measures are aggregated at different levels of details. The user interfaces disclosed herein help users understand how measures are aggregated with object models. Some implementations show the underlying data for each measure rather than displaying a single table with details of all the fields.

FIG. 4A shows a screen shot of a user interface 102 after a user selects to 'View Data' for a data visualization 428, according to some implementations. Some implementations open a pop-up window 436 as shown in FIG. 4A. The pop-window 436 shows results of a disaggregated query that includes all fields in the data source, including Loyalty Reward Points 432 and Unit Cost 434. Some implementations show fully joined level of detail in 'View Data' even though the visualization may not use this level of detail. Measures from two different objects (AVG(Unit Cost) from the Products table, and AVG(Loyalty Reward Points) from the Customers table) are displayed. The example shows replication 430 for Loyalty Rewards Points 432. The average of all the values (including those values that are replicated) results in incorrect values in the summary tab (not shown). For a user, it is not clear if the values are replicated or if the values are actually identical. In other words, the view shows replicated data even though the visualization 428 does not reflect this replication. Although the visualization is correct, 'View Data' does not help the user understand the aggregation.

Figure 4B:
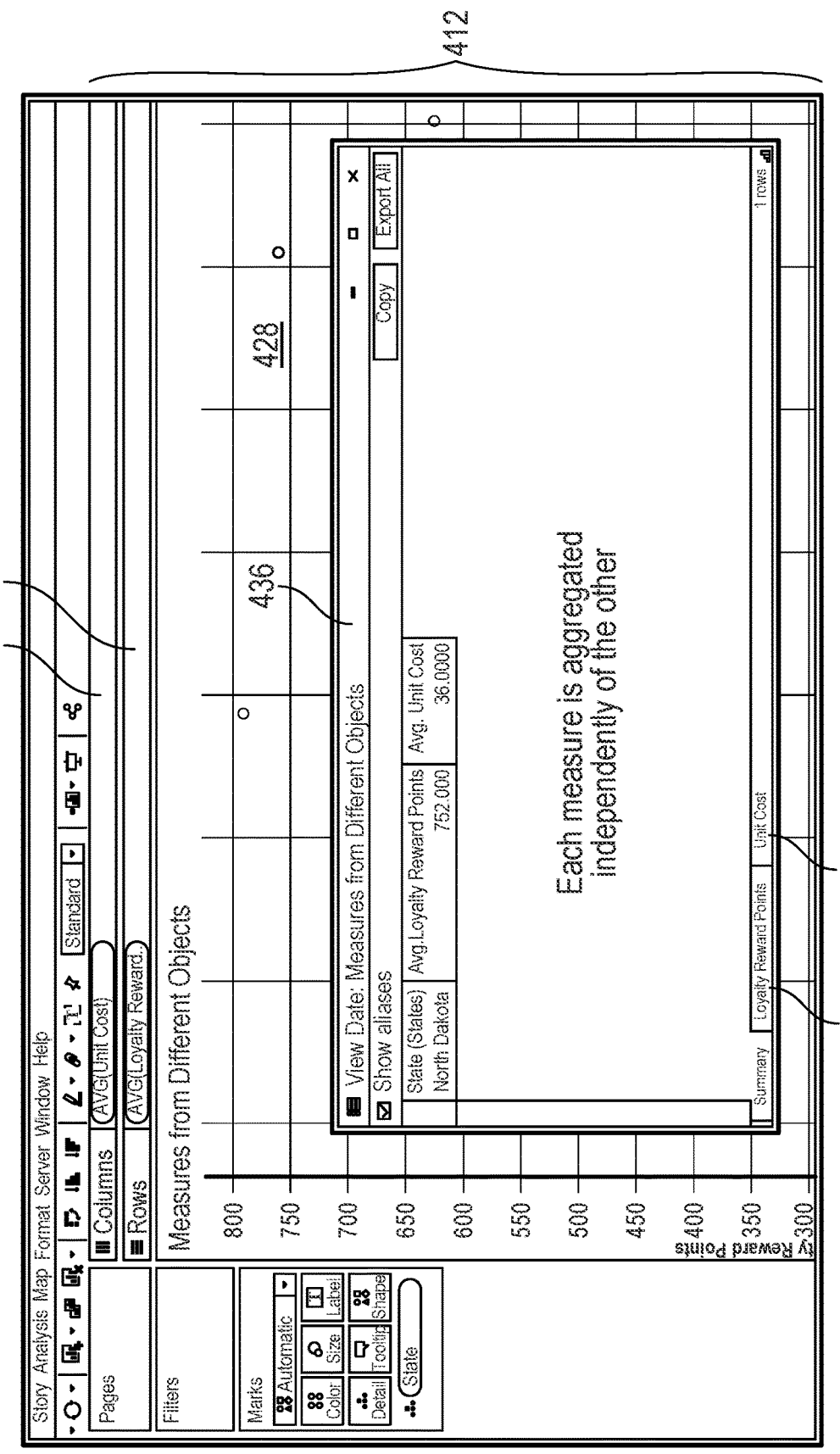

FIG. 4B shows a screen shot of the user interface 102 after a user selects to 'View Data' for a data visualization 428, according to some implementations. In contrast to FIG. 4A, the display shows the measures (AVG(Unit Cost) from the Products table, and AVG(Loyalty Reward Points) from the Customers table)) independent of each other. In the example shown, each measure is displayed in a respective tab (e.g., tabs 438 and 440) of the pop-up window 436. Each measure can have a different level of detail, so showing the measures in separate tabs allow each measure to be shown at a different level of detail as needed. In other words, each measure is aggregated independently.

Figure 4C:
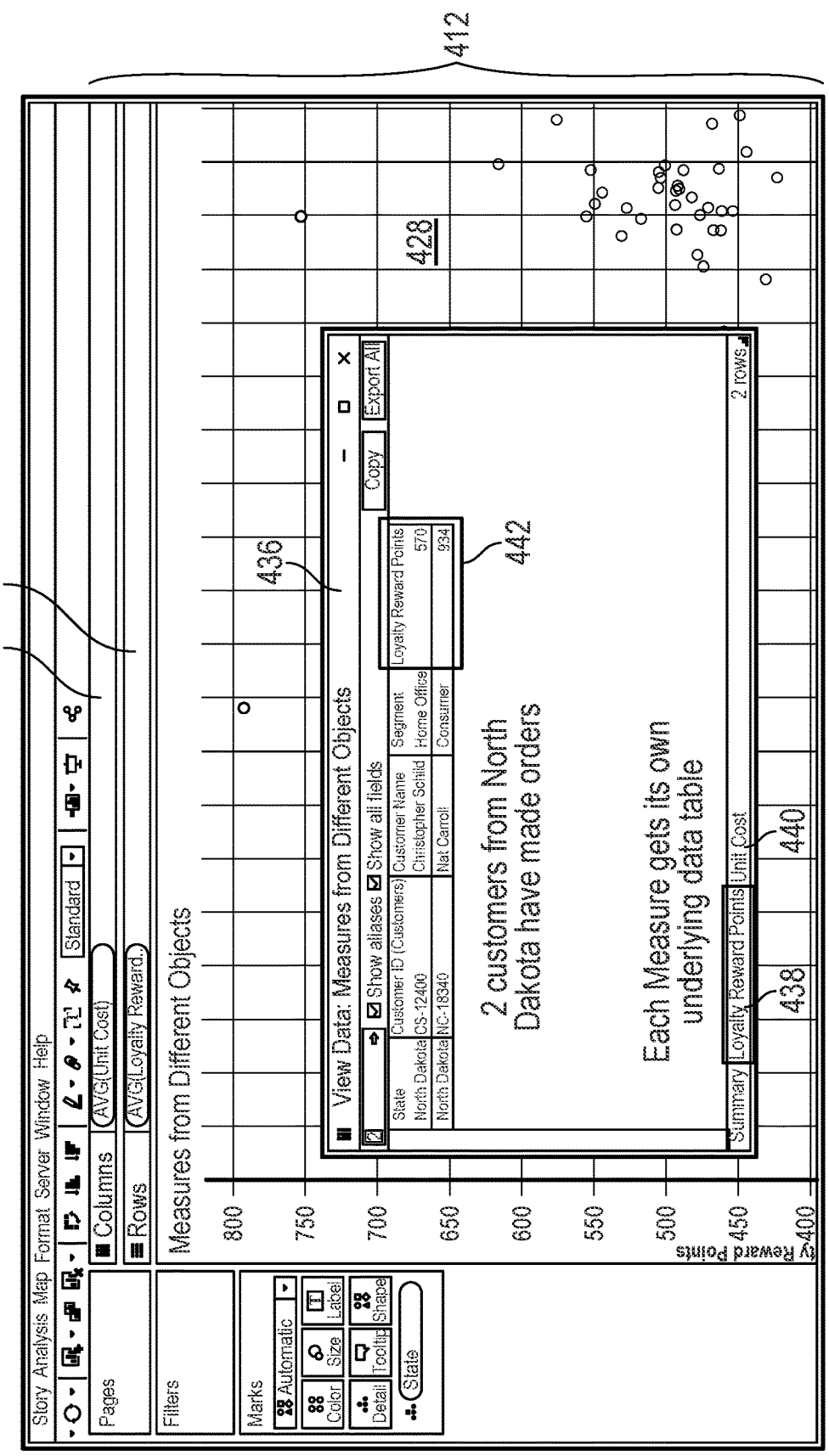
Figure 4D:
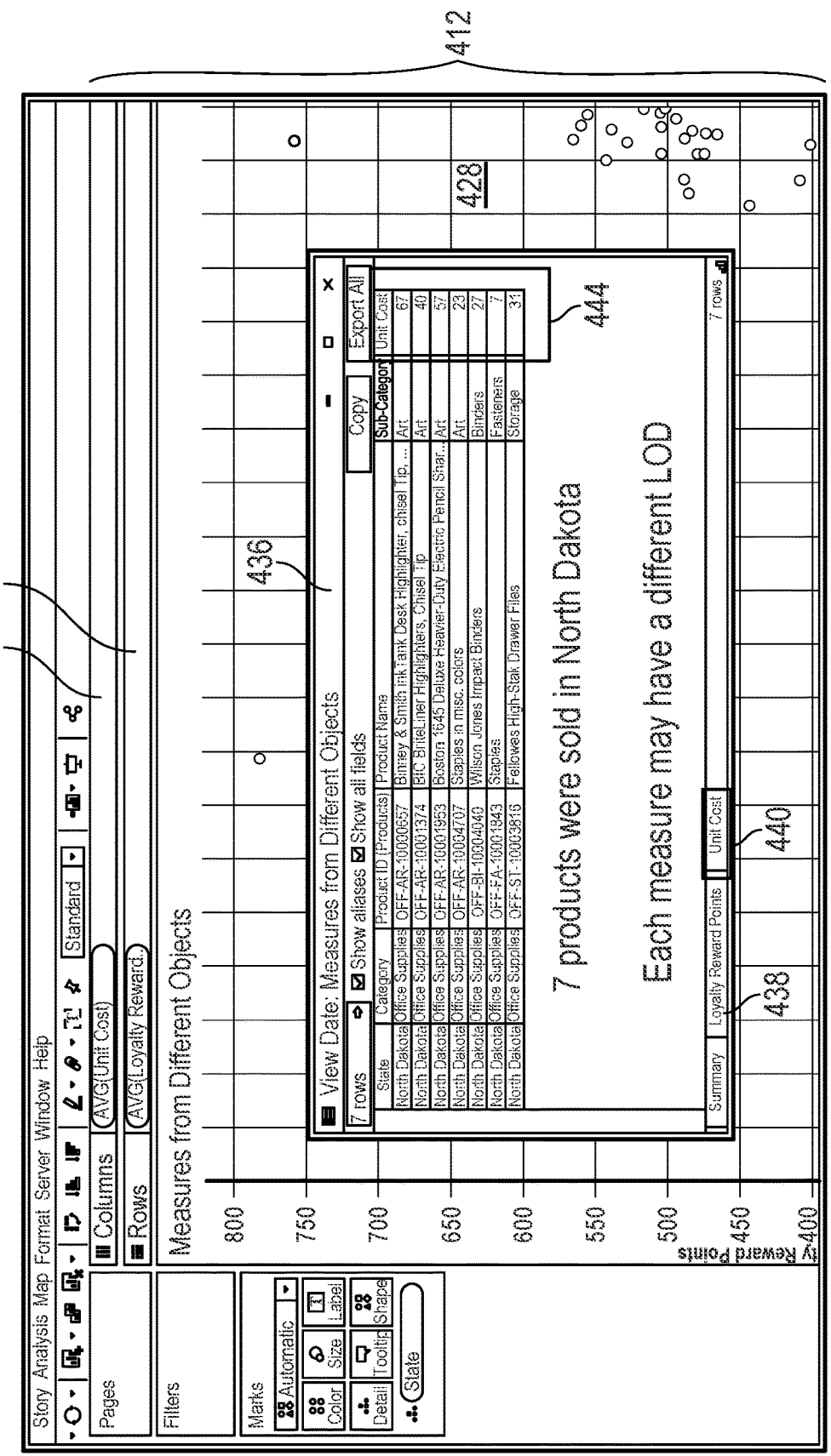

FIG. 4C shows another screen shot of the user interface 102, according to some implementations. In this example, two customers from North Dakota have placed orders. The tab 438 corresponds to the Loyalty Rewards Points earned (indicated by the column 442) by the two customers. The computer displays a corresponding table for each measure (corresponding to the tabs 438 and 440, respectively), according to some implementations. FIG. 4D shows another screen shot of the user interface 102, according to some implementations. In this example, 7 products were sold in North Dakota. The tab 440 corresponds to the Unit Costs (indicated by the column 444) for the seven products. In some implementations, a corresponding table is displayed for each measure (corresponding to the tabs 438 and 440, respectively). In some implementations, each measure may have a different level of detail. The examples illustrate that there are two rows averaged from the Customers table for AVG(Loyalty Rewards Points) of 752.0 and that 7 rows from the Product table were averaged for AVG(Unit Cost) of 36.0.

Figure 4E:
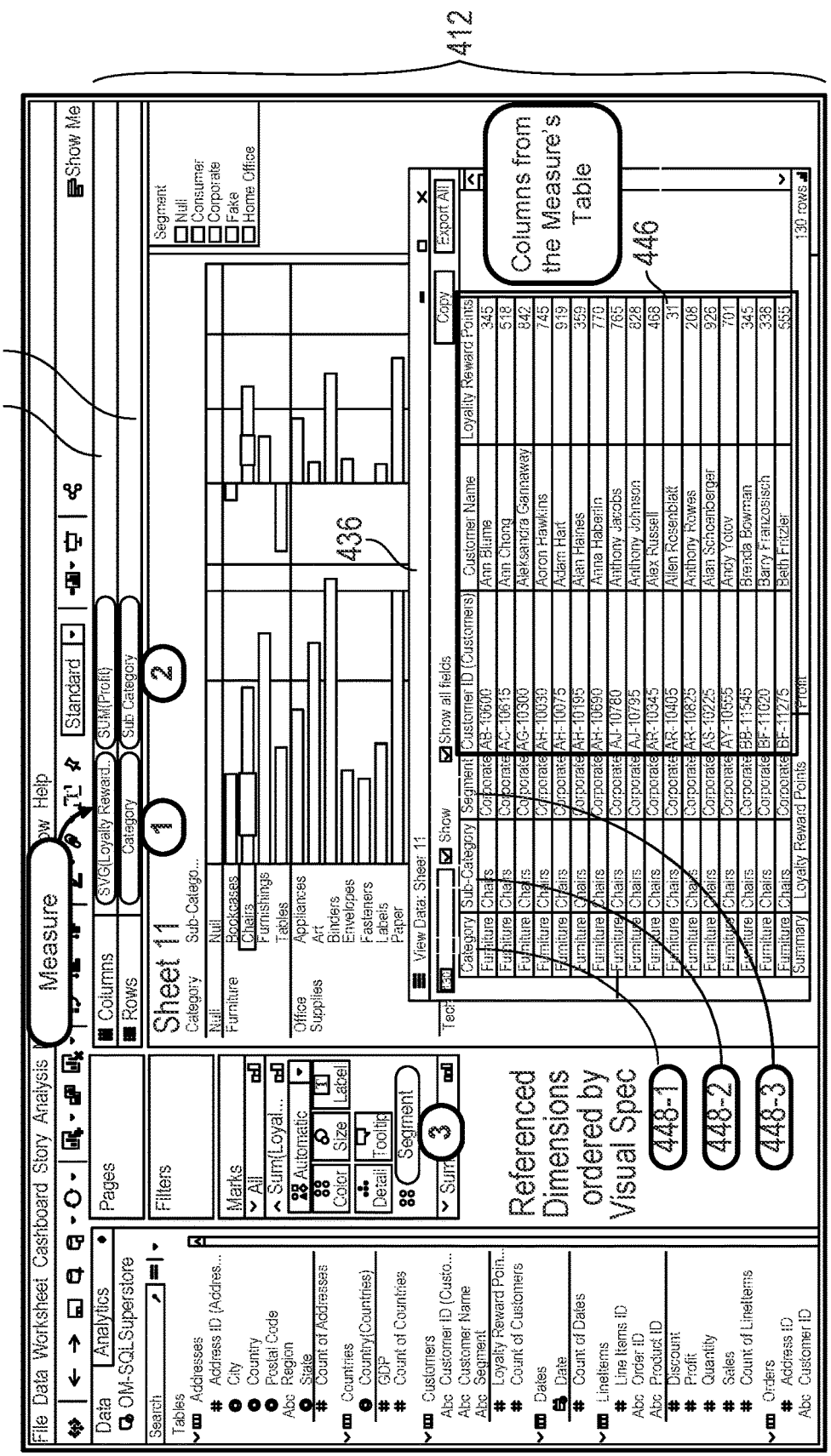

FIG. 4E shows another screen shot of the user interface 102, according to some implementations. Some implementations provide more context related information (e.g., columns 446) for each measure. Some implementations include the referenced dimensions (Category 1, Sub Category 2, and Segment 3) in the visualization and order (448) the dimensions by their position in the visual specification. The Category is in the first column 448-1, the Sub-Category is in the second column 448-2, and the Segment is in the third column 448-3. Thus, some implementations provide proper disaggregated level of detail for each measure.

Figure 4F:
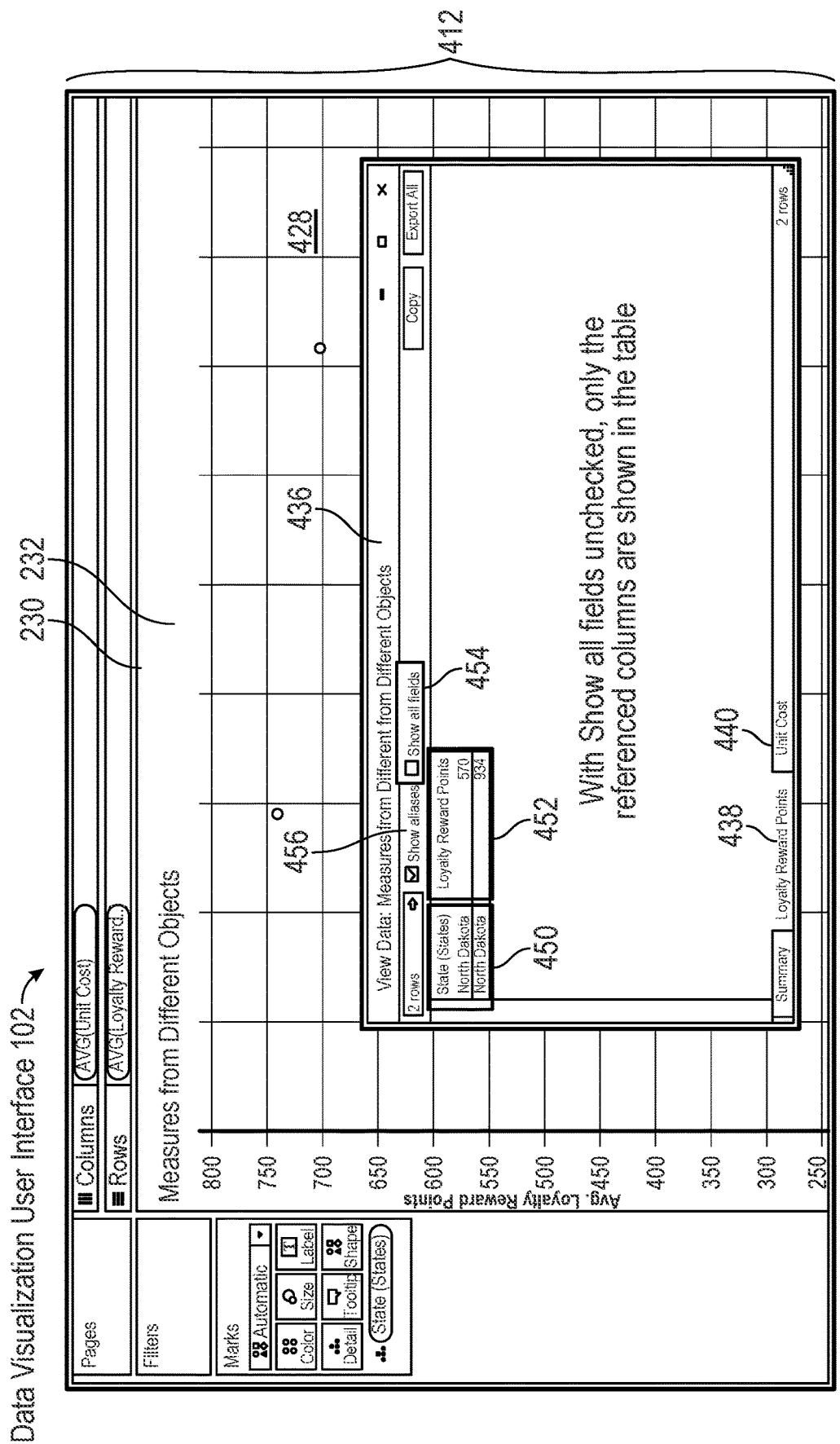
Figure 4G:
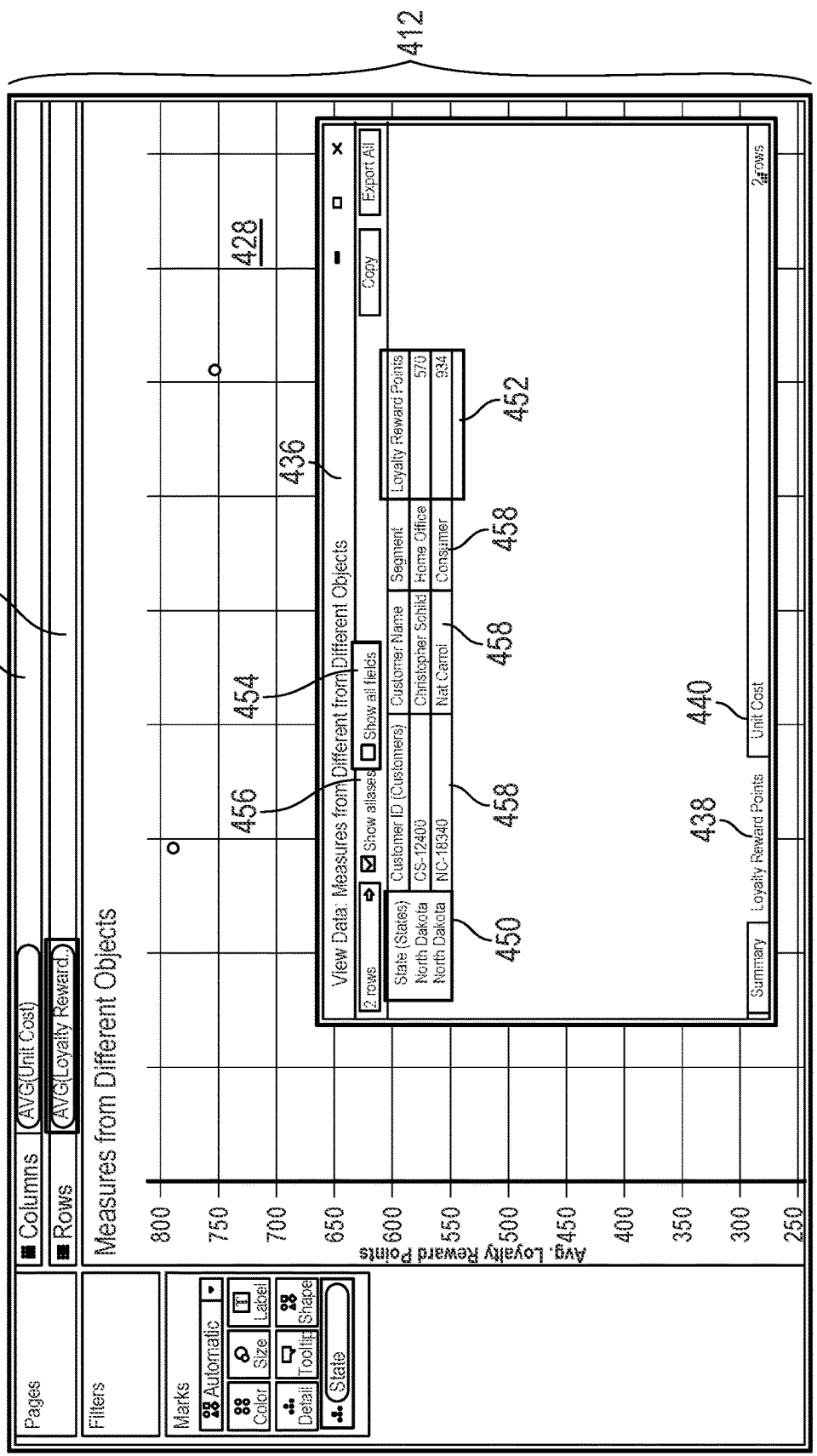

FIG. 4F shows another screen shot of the user interface 102, according to some implementations. Some implementations show only the referenced columns for each measure. For example, in FIG. 4F, the table corresponding to the measure 438 shows only the State(States) 450 and the Loyalty Reward Points 452, when the Show all fields option 454 is unchecked. Some implementations provide an option 456 to show aliases. FIG. 4G shows another screen shot of the user interface 102, according to some implementations. Some implementations show all of the columns for each measure. For example, in FIG. 4G, the table corresponding to the measure 438 shows the State(States) 450, the Loyalty Reward Points 452, as well as other columns 458, when the Show all fields option 454 is unchecked. For this example, a user can see that there are two customers.

Thus, in various implementations, the user interfaces shown in FIGS. 4B-4G are advantageous in showing underlying data for each measure. Some implementations show a tab per measure and thereby show how each measure is aggregated at independent levels of detail from other measures. Some implementations avoid data replication or showing the wrong level of detail that typically occurs when showing data from fully joined data sources.

Figure 5A:
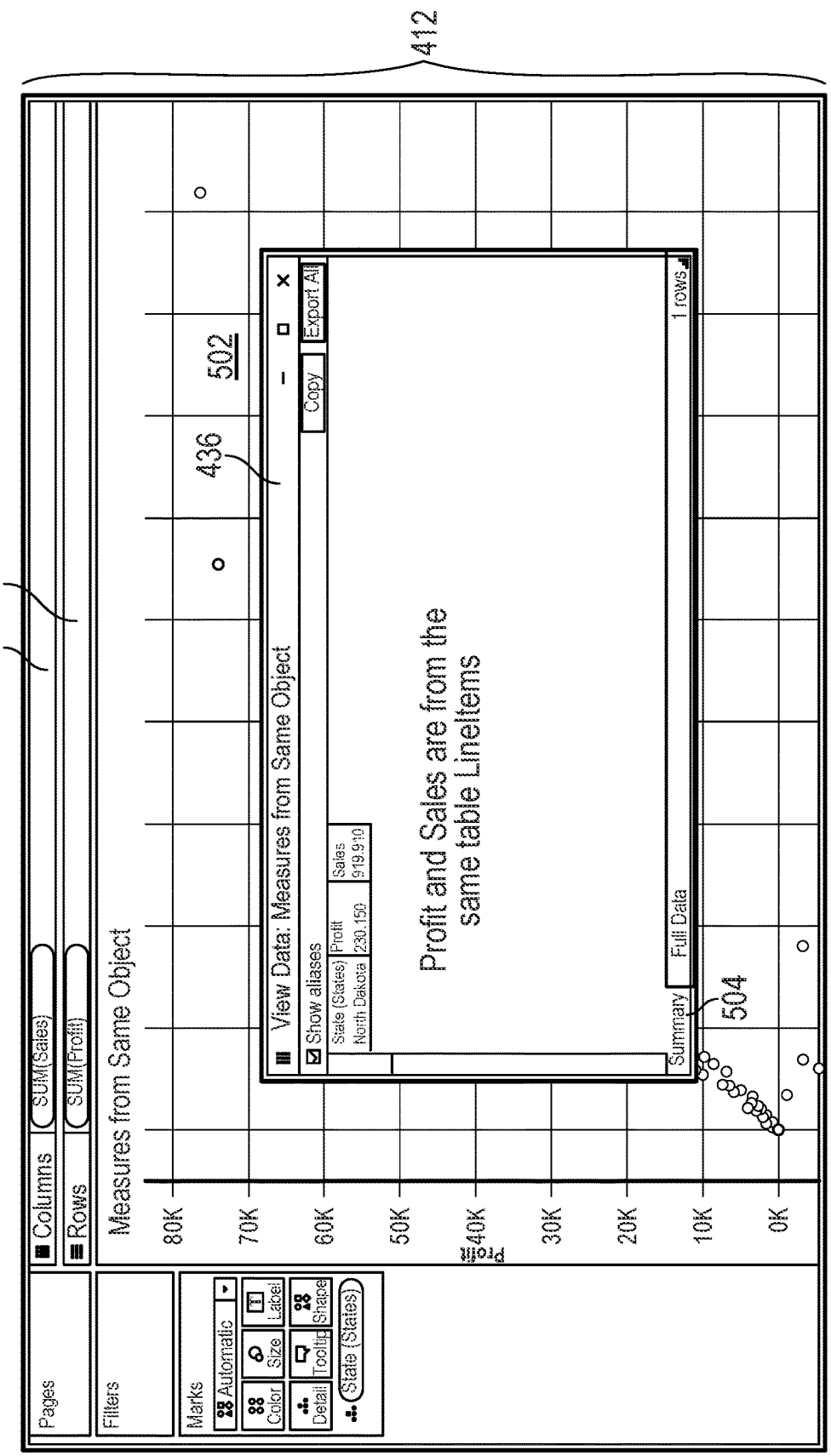
Figure 5B:
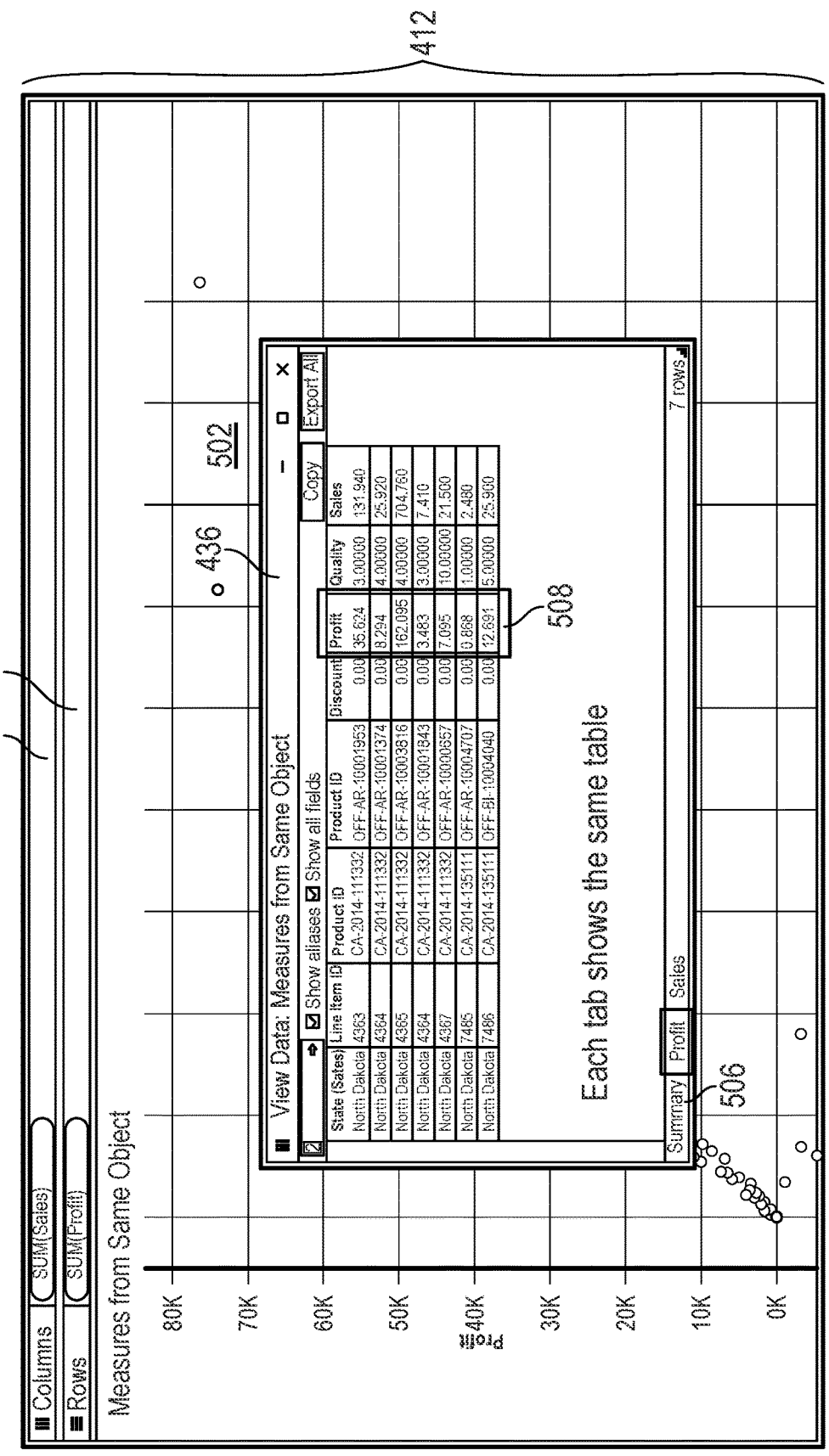
Figure 5C:
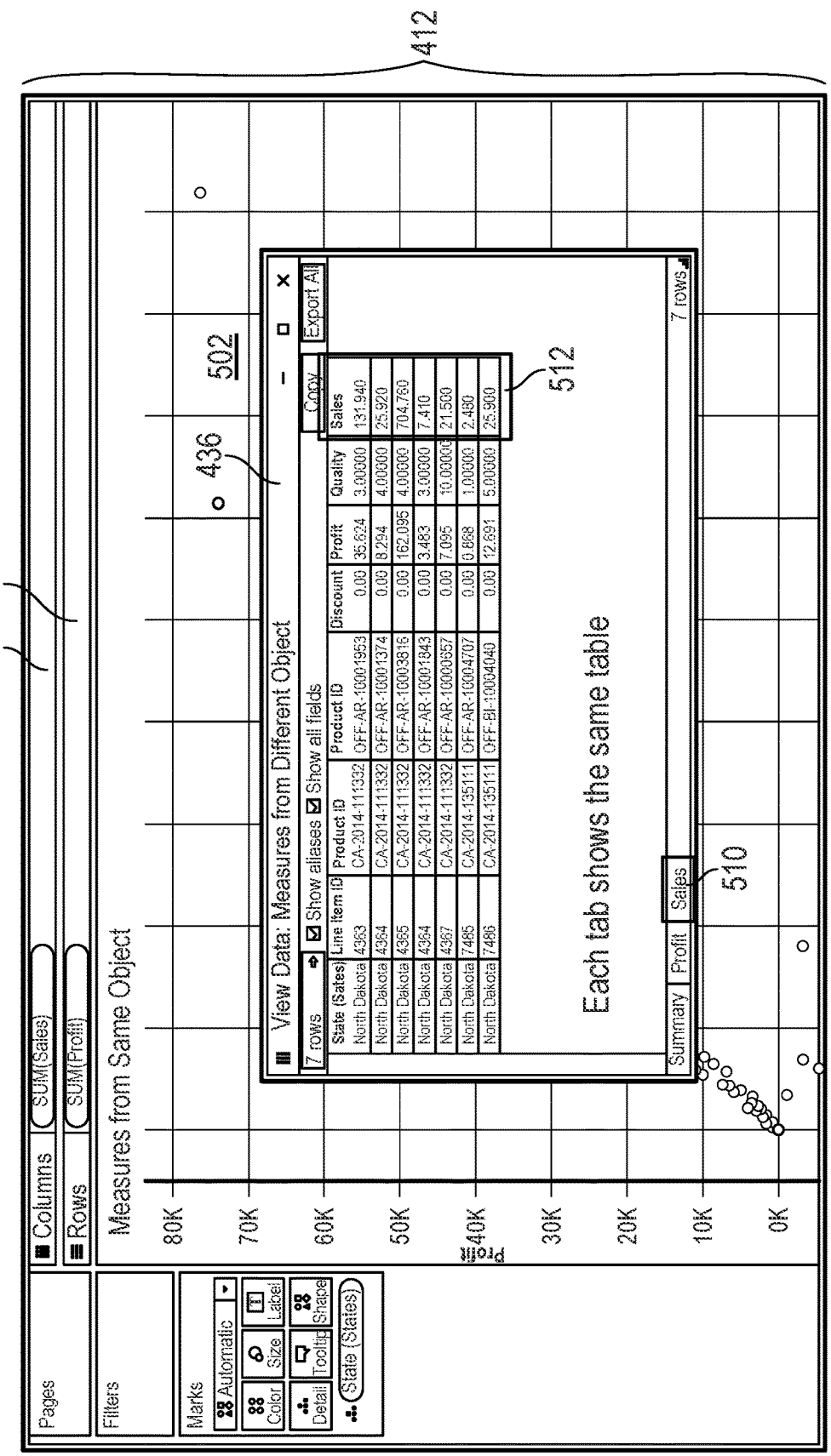
Figure 5D:
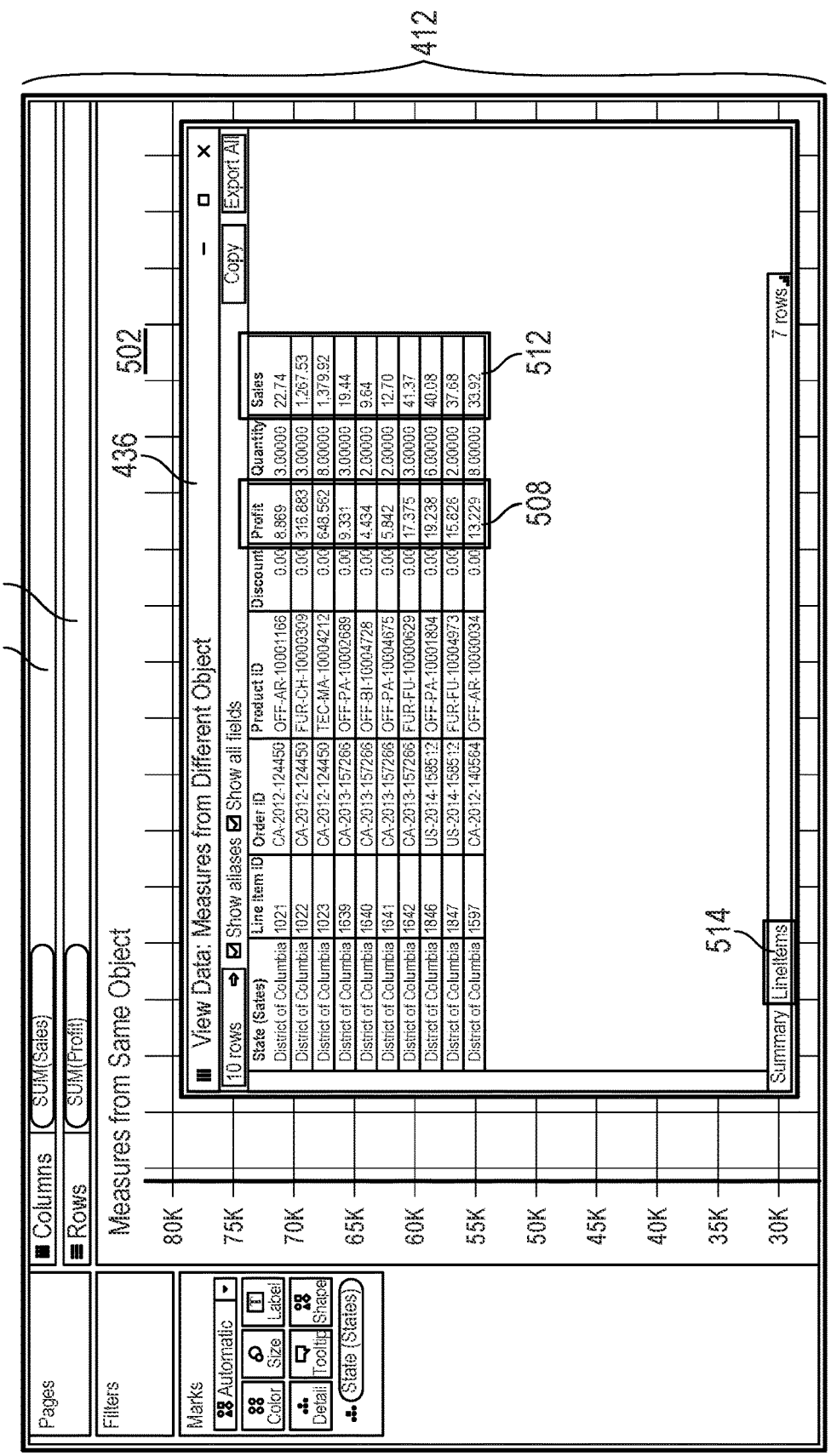

FIGS. 5A-5D show screen shots of the user interface 102 for a scenario when measures (of the data visualization 502) come from the same table, according to some implementations. The data visualization 502 is a scatterplot of Profit versus Sales. As the summary tab 504 in the view data window 436 indicates, Profit and Sales are from the same table LineItems. In FIGS. 5B and 5C, the Profit tab 506 and Sales tab 510 each show the same table. In some implementations, the respective columns (sometimes called referenced columns, such as column 508 in FIG. 5B and column 512 in FIG. 5C) corresponding to the measures are highlighted. In these examples, each measure has the same level of detail but two tabs are shown with identical data. Some implementations show the same table to let a user know that the measures come from the same table. Some implementations collapse all measures from the same table into one tab and/or label it with a table name. Some implementations include dimensions in play from the visualization from other objects. This way, some implementations remove redundant information. As shown in FIG. 5D, some implementations collapse measures into object tabs. Some implementations also show referenced dimensions so that the dimensions are present when viewing data by object. In FIG. 5D, a single LineItems tab 514 is shown rather than identical Sales and Profit tabs, along with the referenced dimensions from this object and other columns of the table (e.g., dimensions referenced from other objects). In some implementations, calculations that do not belong to an object are shown in a separate tab. Some implementations collapse tabs into object tabs and keep dimensions, and show calculations in their own tabs.

Figure 6:
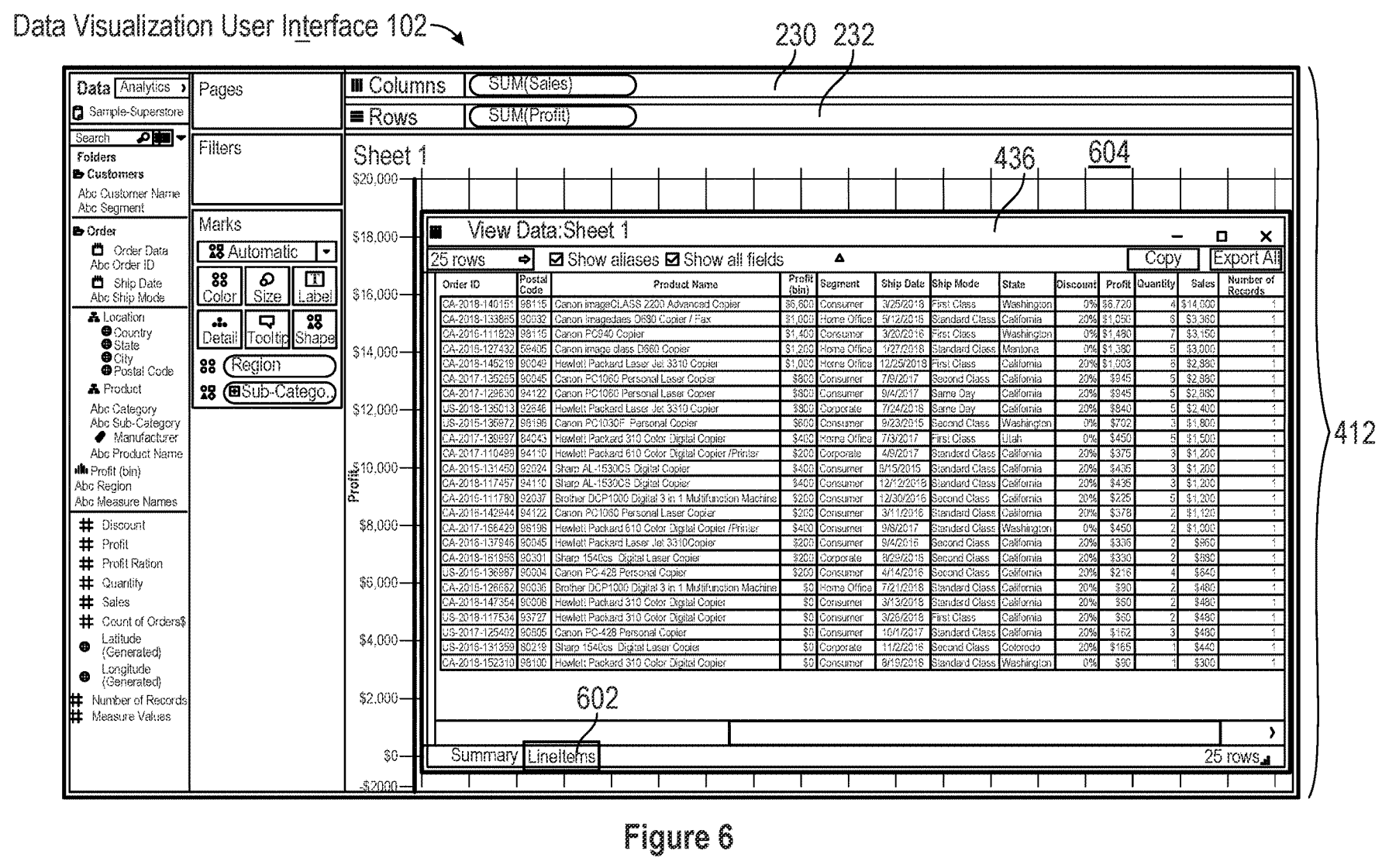

FIG. 6 shows a screen shot of the user interface 102 for a single object data source, according to some implementations. In some implementations, a 'Full Data' tab 602 in a 'View Data' window 436 provides similar functionality (as explained above in reference to FIGS. 5A-5D) for the data visualization 604.

Figure 7A:
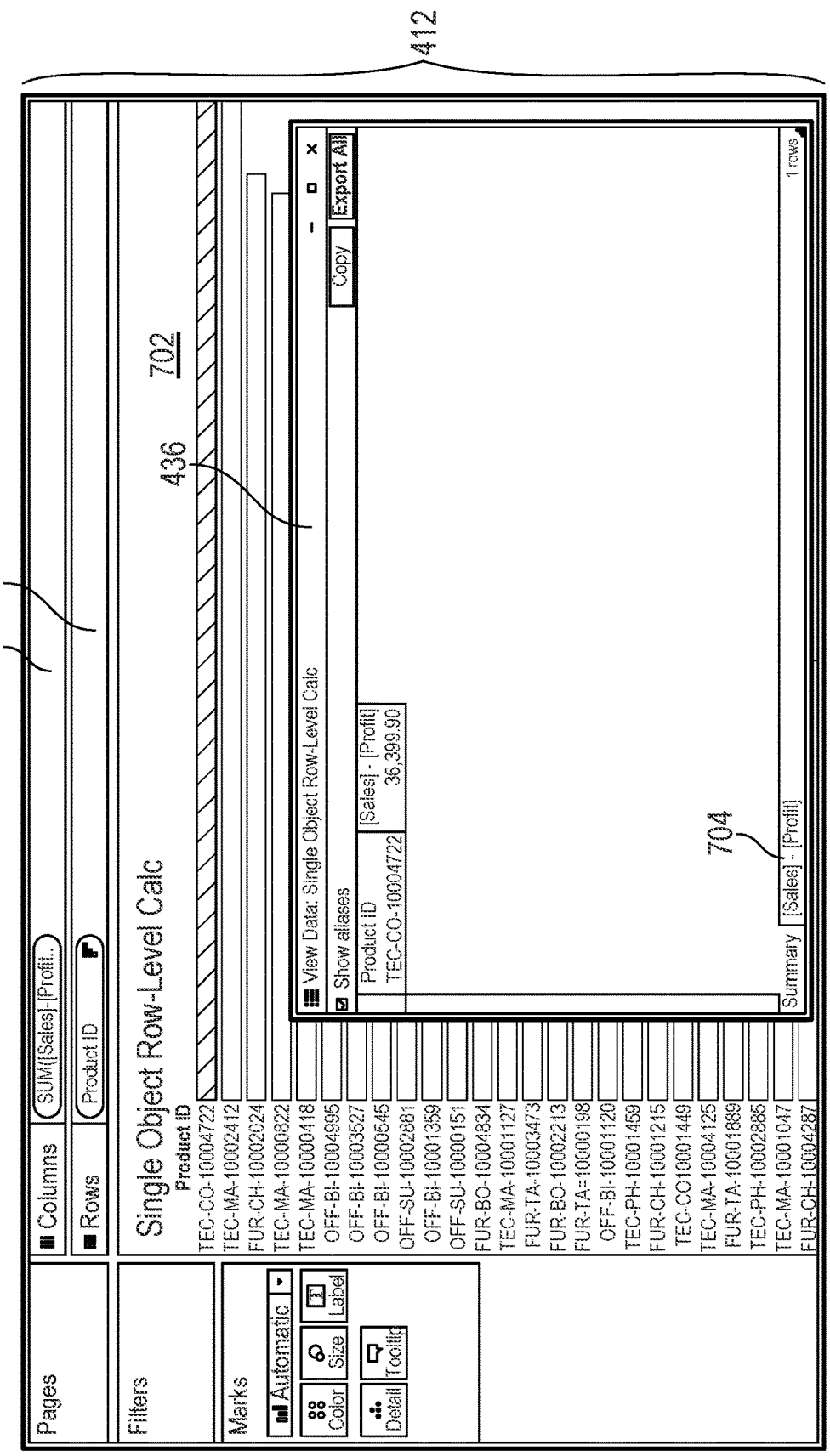
Figure 7B:
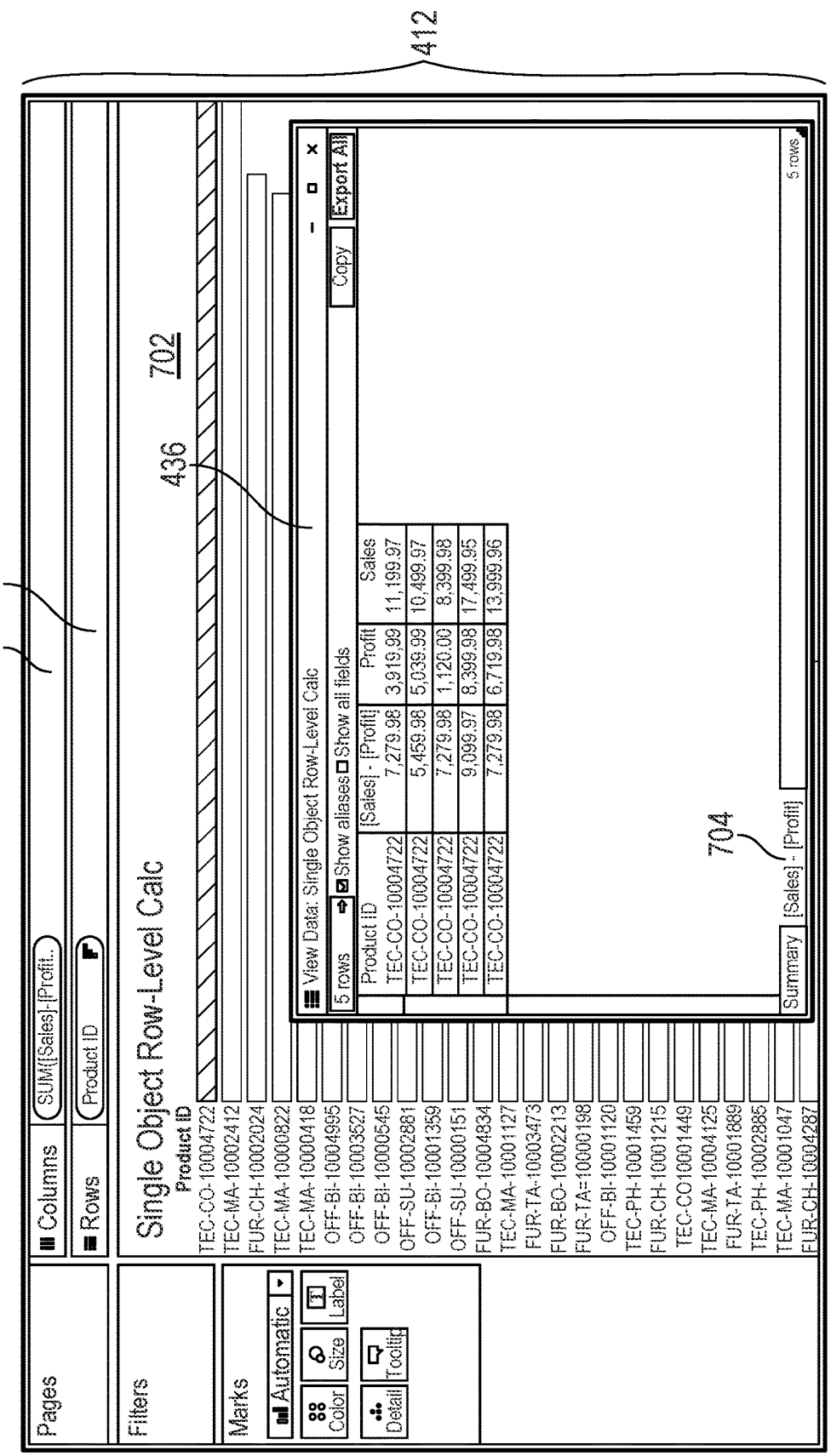
Figure 7C:
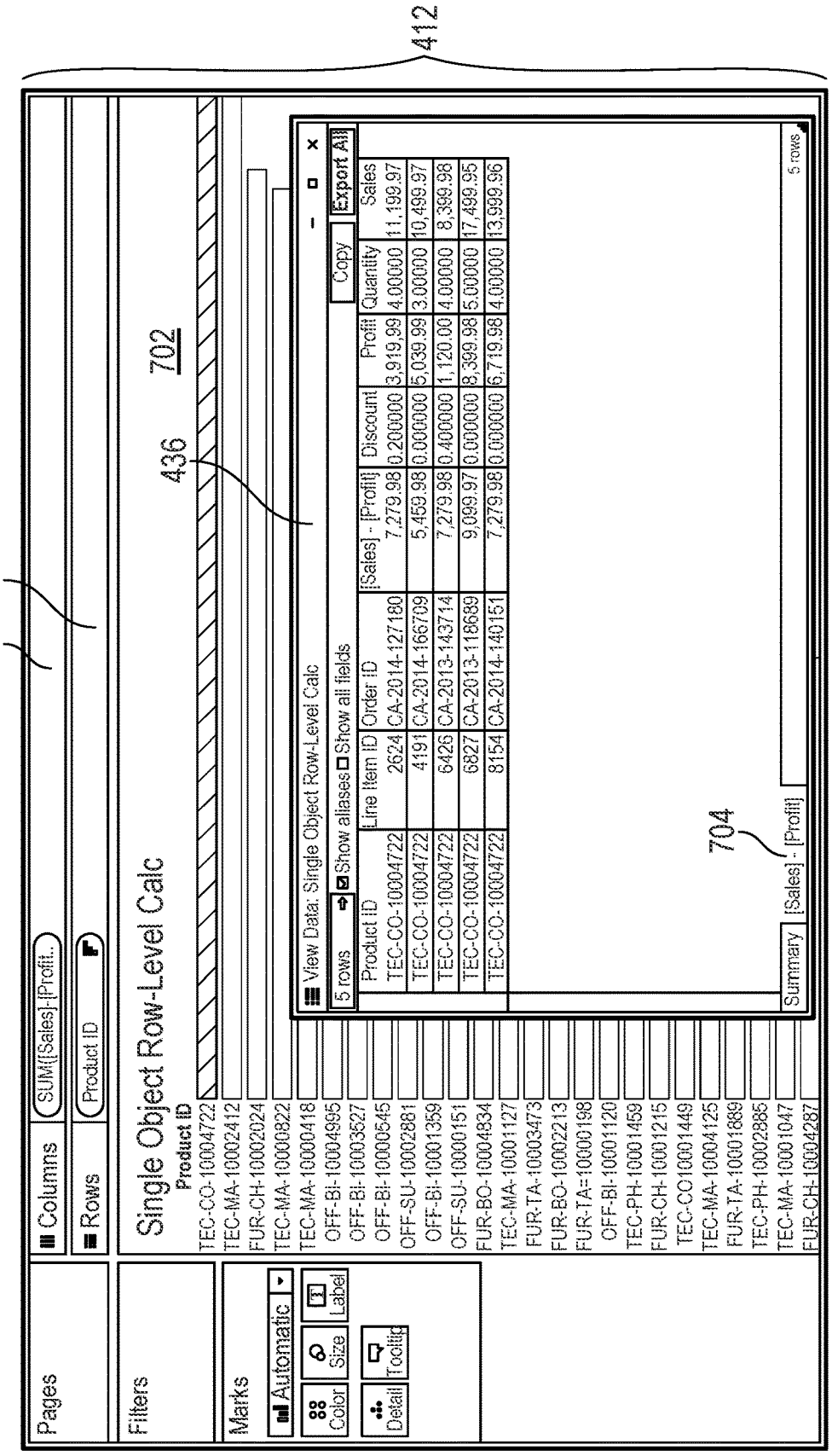

FIGS. 7A-7I show screen shots of the user interface 102 for calculations, according to some implementations. In the example shown in FIGS. 7A-7C, the data visualization 702 is a bar chart for SUM(Sales−Profits) for different products. As shown, the referenced calculation is shown in a separate tab 704 (similar to how measures are displayed in separate tabs, as explained above in reference to FIGS. 5A-5D). In some implementations, measures that are referenced in a calculation's formula are shown to provide better context to the user. Some implementations allow the user to verify row-level calculations. As shown in FIG. 7B, fields referenced by the calculation are shown (e.g., even when Show All fields is unchecked by the user), according to some implementations. In some implementations, as shown in FIG. 7C, when show all fields is checked by the user, all fields from the calculation's table are shown.

Figure 7D:
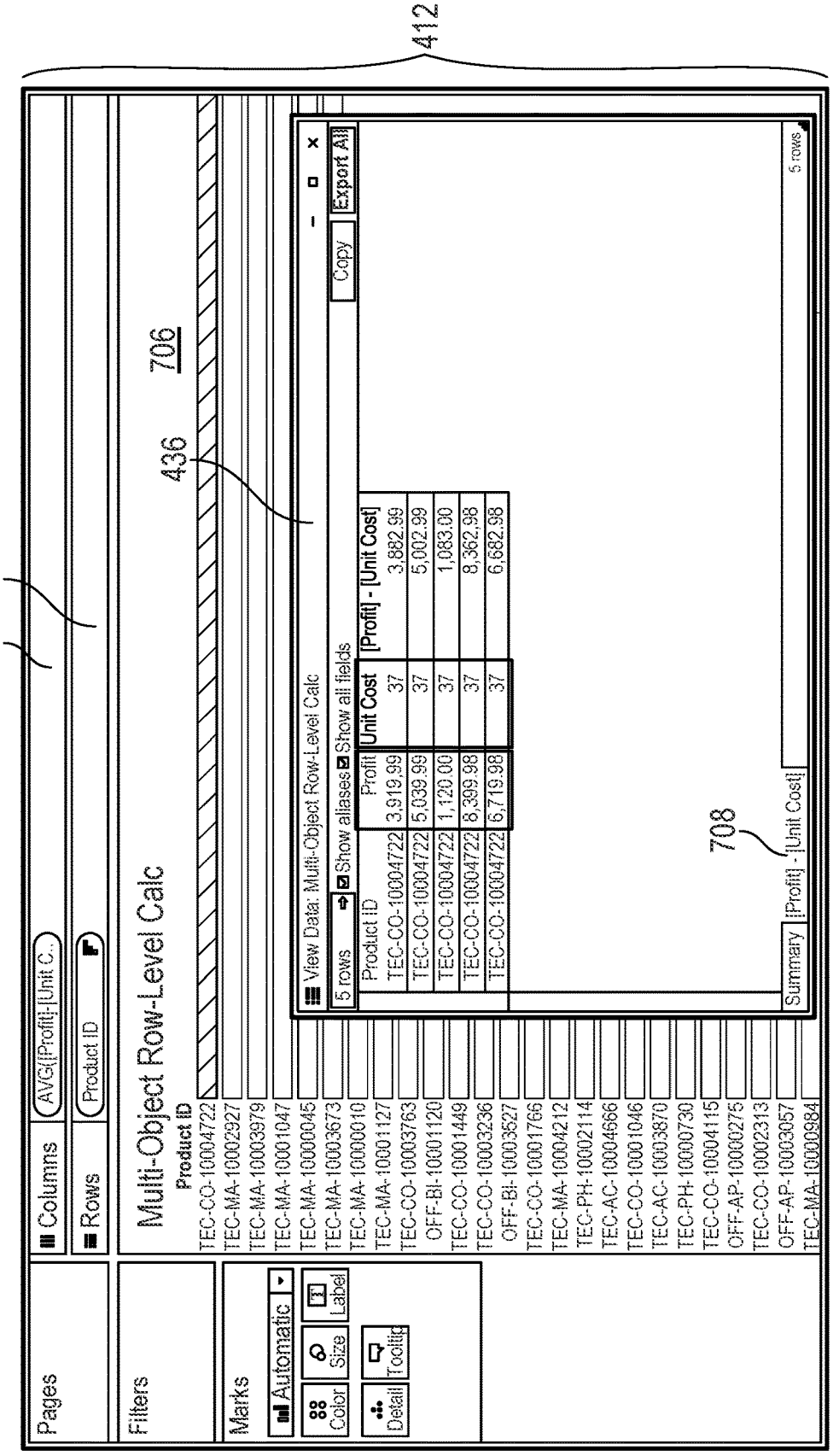
Figure 7E:
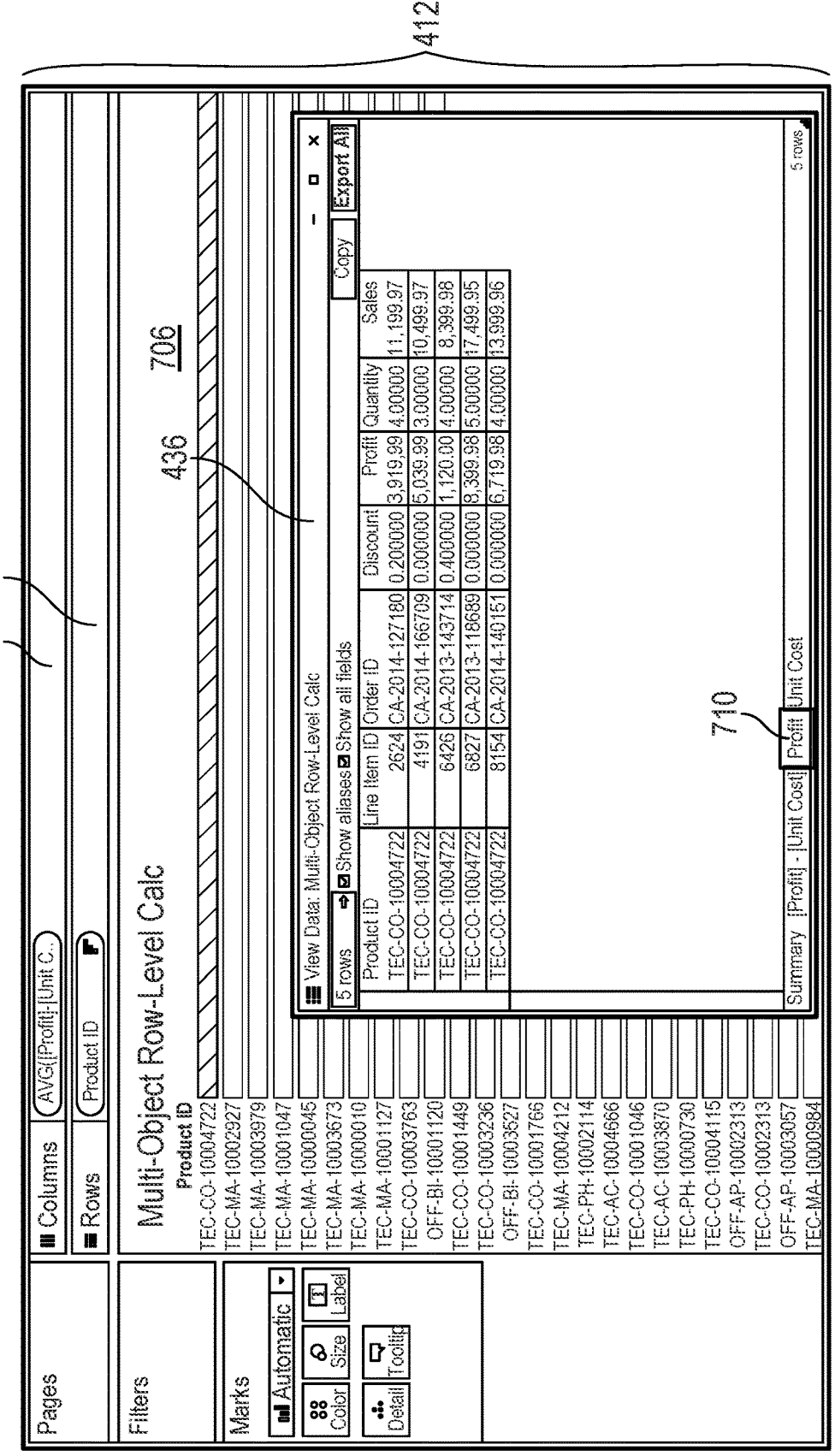
Figure 7F:
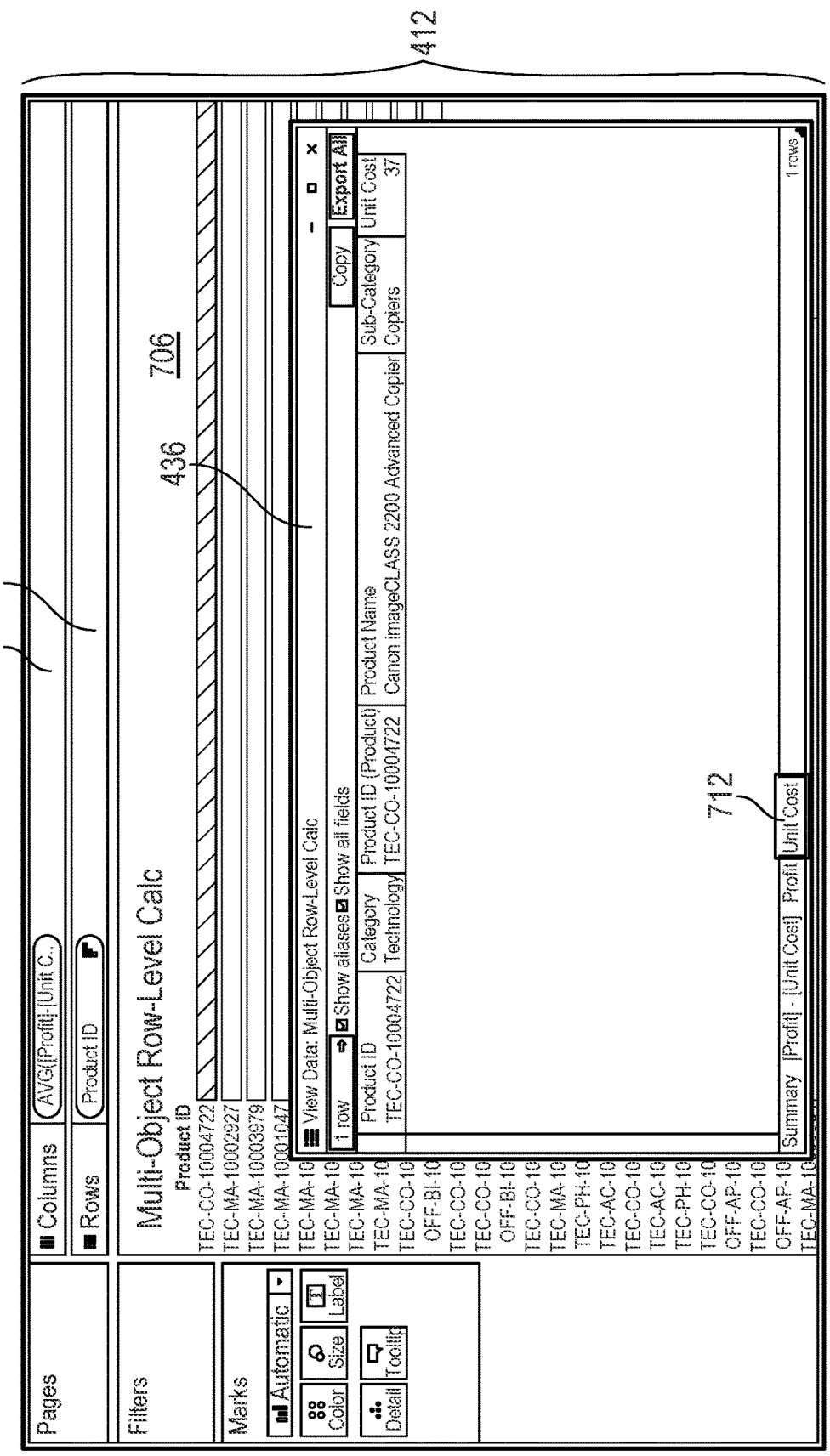

FIGS. 7D-7F show screen shots of the user interface 102 for multi-object row-level calculations, according to some implementations. The visualization 706 corresponds to a row-level calculation that uses columns from different tables that are at different levels of detail. Some implementations allow the user to verify the row-level calculations. The calculation [Profit]−[Unit Cost] uses different tables, each having a different level of detail, so some implementations do not add additional columns. The example in FIG. 7D shows (in the tab 708) Unit Cost replicated (while Profit is not). The user can see the average of [Profit]−[Unit Cost] rows equal the Summary result. Some implementations indicate whether [Unit Cost] is really being replicated. As shown in FIGS. 7E and 7F, some implementations display a tab for each measure (e.g., the tabs 710 and 712) used by the referenced calculation. Some implementations also show context information for fields from a measure's table. This way, different levels of detail for each measure can be displayed. For example, [Unit Cost] and [Profit] are shown at different levels of details in FIGS. 7E and 7F, according to some implementations.

Figure 7G:
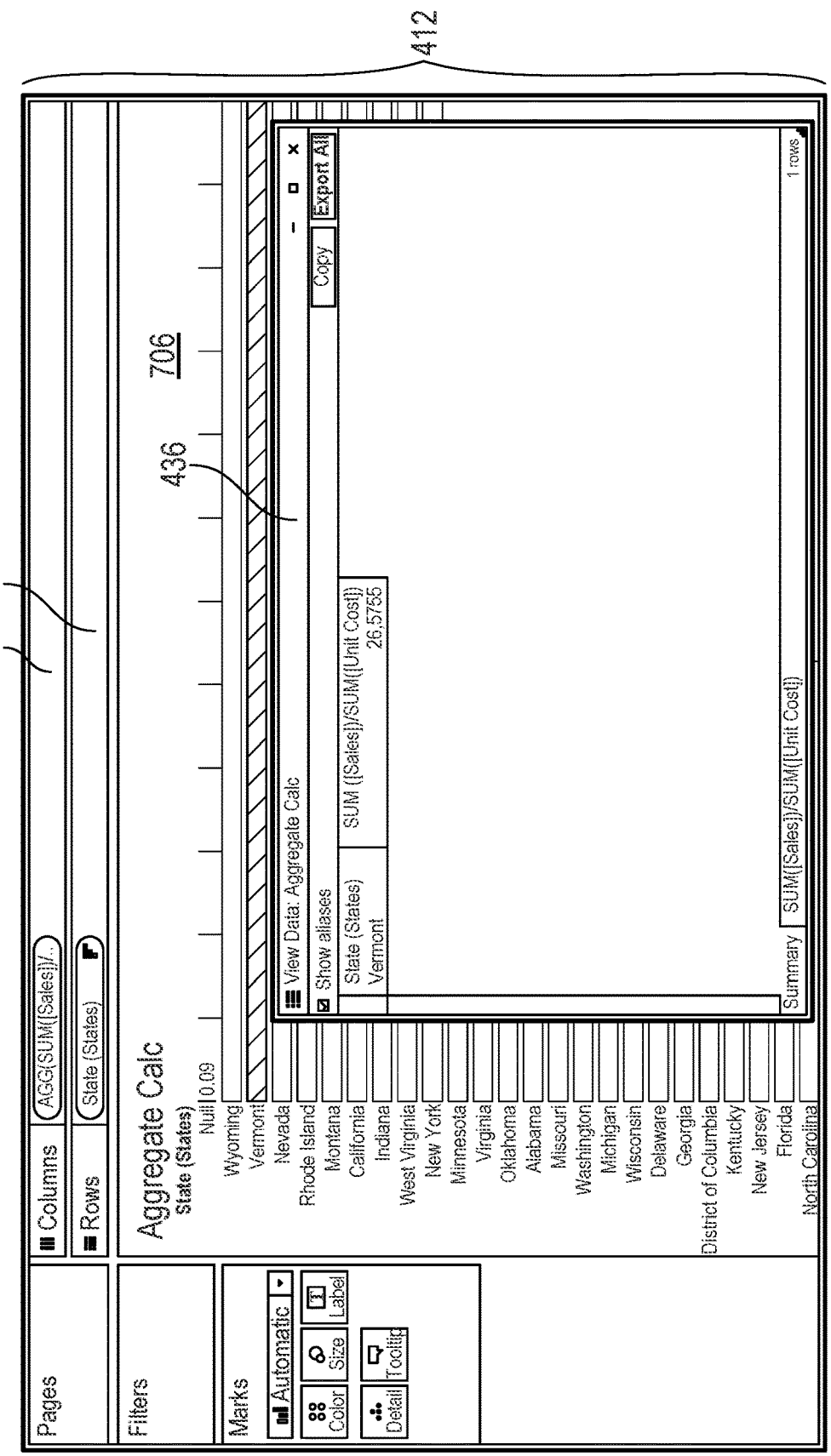
Figure 7H:
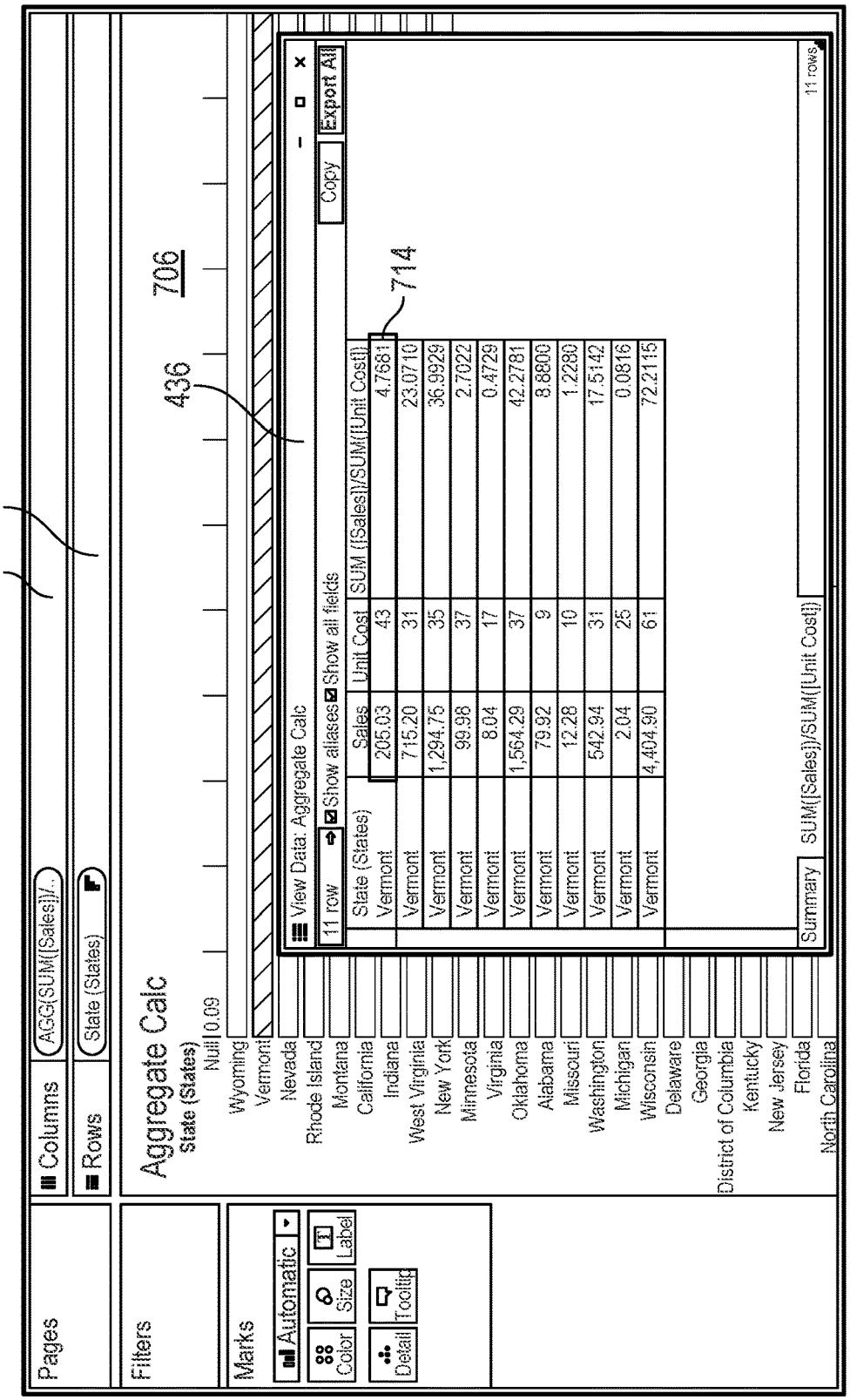
Figure 7I:
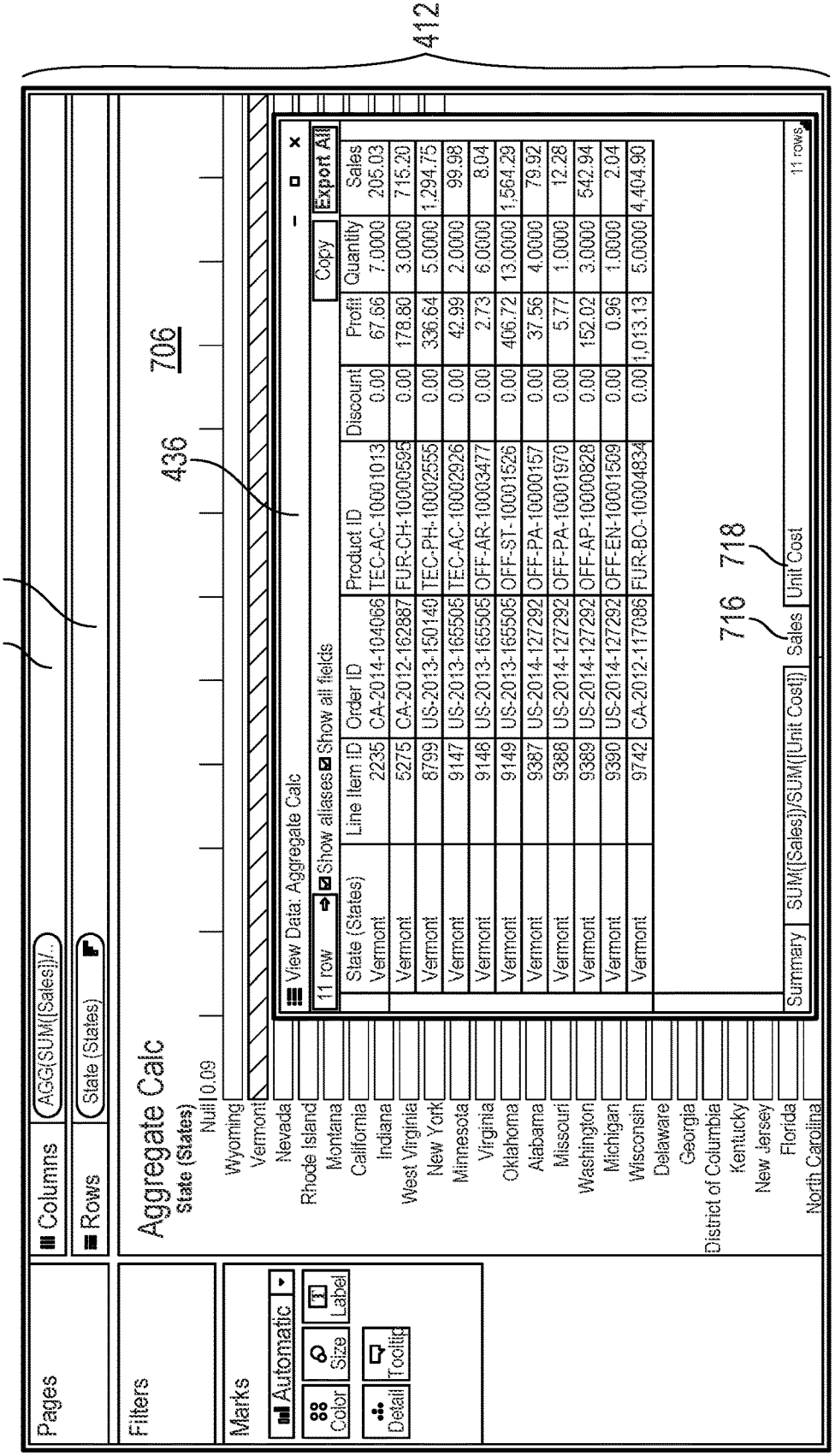

FIGS. 7G-7I show screen shots of the user interface 102 for aggregate calculations, according to some implementations. The visualization 706 (a bar chart) corresponds to an aggregate calculation SUM([Sales])/SUM([Unit Cost]). Some visualization platforms incorrectly show disaggregated data implying that aggregate calculations like row-level calculations, an example of which is shown in FIG. 7H. The display incorrectly implies that Sales is divided by Unit Cost for each row (e.g., the row 714). In some implementations, SUM([Sales]) is divided by SUM([Unit Cost]) after each measure is independently aggregated, as shown in FIG. 7G. Some implementations show an aggregated view of data underlying a data visualization in the calculation tab. For example, some implementations show sum of Sales and sum of Unit Cost in a single row along with the aggregate calculations. In some implementations, this is similar to what is shown in the summary tab but with SUM([Sales]) and SUM([Unit Costs]). In some implementations, as shown in FIG. 7I, similar to other multi-object scenarios described above, measures from calculations are shown in their own tabs so that different levels of detail can be shown. For example, in FIG. 7I, Sales and Unit Cost are shown in separate tabs 716 and 718. Thus, different levels of details can be shown for each referenced measure from a calculation.

In some implementations, Level of Detail (LOD) calculations are shown in separate tabs. LOD calculations can be at a different levels of detail than the visualization and/or the underlying data source. Include and Exclude LOD calculations share dimensions with the visualization LOD, while Fixed LOD calculations may not have any dimension in common with the visualization, for example. In some implementations, Fixed LOD calculations whose dimensions come from a single object are assigned to that Object. For example, Fixed LOD calculations are added to that table tab. In some implementations, all other types of LOD calculations are shown in separate tabs, because those calculations do not belong to a specific table. Some implementations show all types of LOD calculations in separate tabs (e.g., even Fixed LOD calculations whose dimensions are from a single object are shown in separate tabs).

Some implementations show multi-object LOD calculations by determining a Least Common Ancestor (LCA) object and showing the calculations under a tab for that object. For example, FIXED[Line Item ID], [State]: SUM([Sales]) is shown as part of the Line Items table in a Schema Viewer, but not as part of the Line Items tab in the 'View Data' window.

FIGS. 8A-8D provide a flowchart of a method 800 for generating (802) data visualizations using an object model according to the techniques described above, in accordance with some implementations. The method 800 is performed (804) at a computing device 200 having one or more processors and memory. The memory stores (806) one or more programs configured for execution by the one or more processors.

In some implementations, the computer displays (e.g., in a connections region) a plurality of data sources. Each data source is associated with a respective one or more tables.

The computer receives (808) user selection of a data source (e.g., a selection of one of the plurality of data sources). In response, the computer (810) displays a data visualization in a data visualization user interface, according to placement of data fields, from the data source, in shelves of the user interface. The data visualization includes a plurality of visual data marks representing data from the data source. The computer detects (812) a first user input to select a subset of the visual data marks.

Figure 8A:
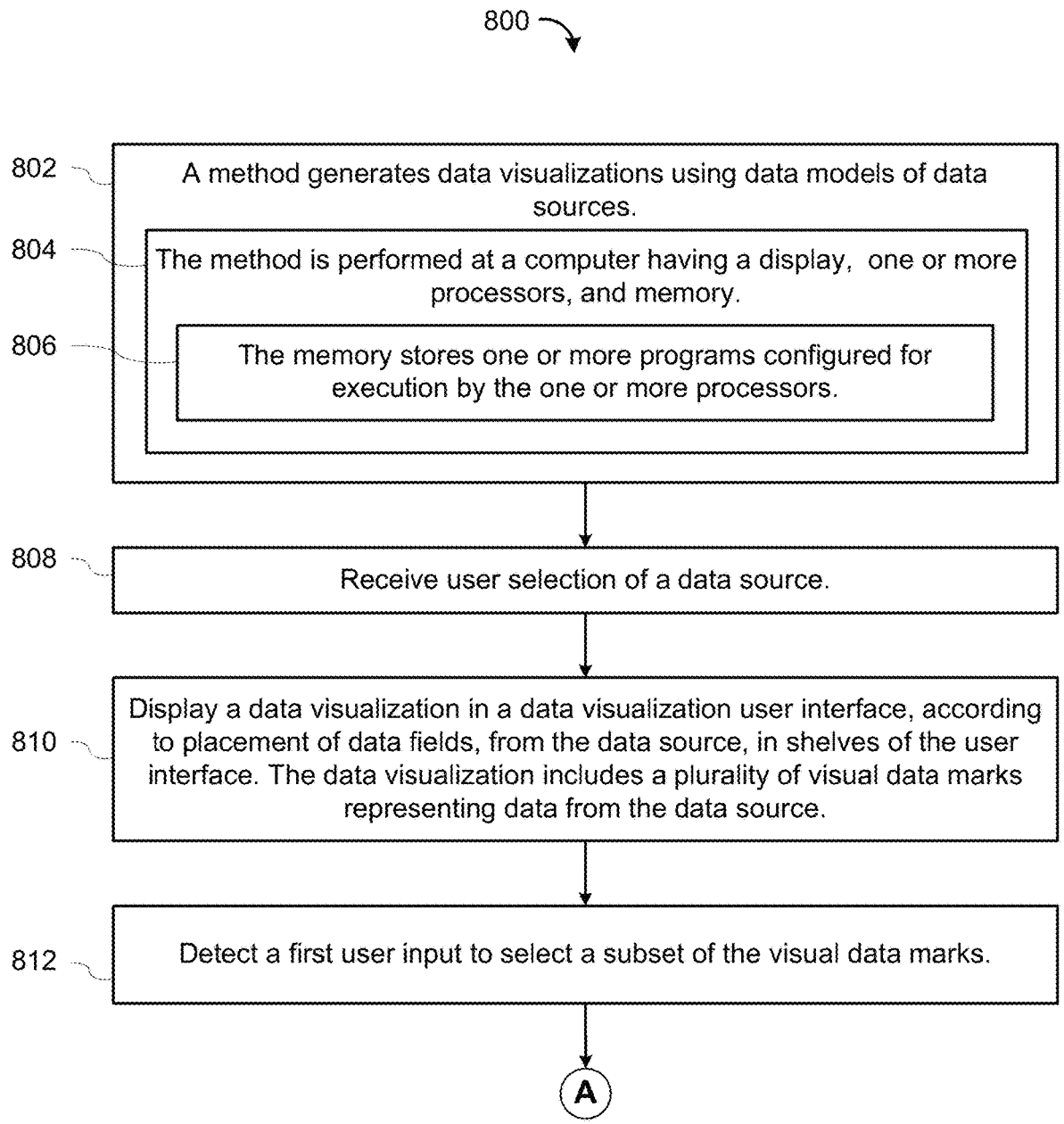
Figure 8B:
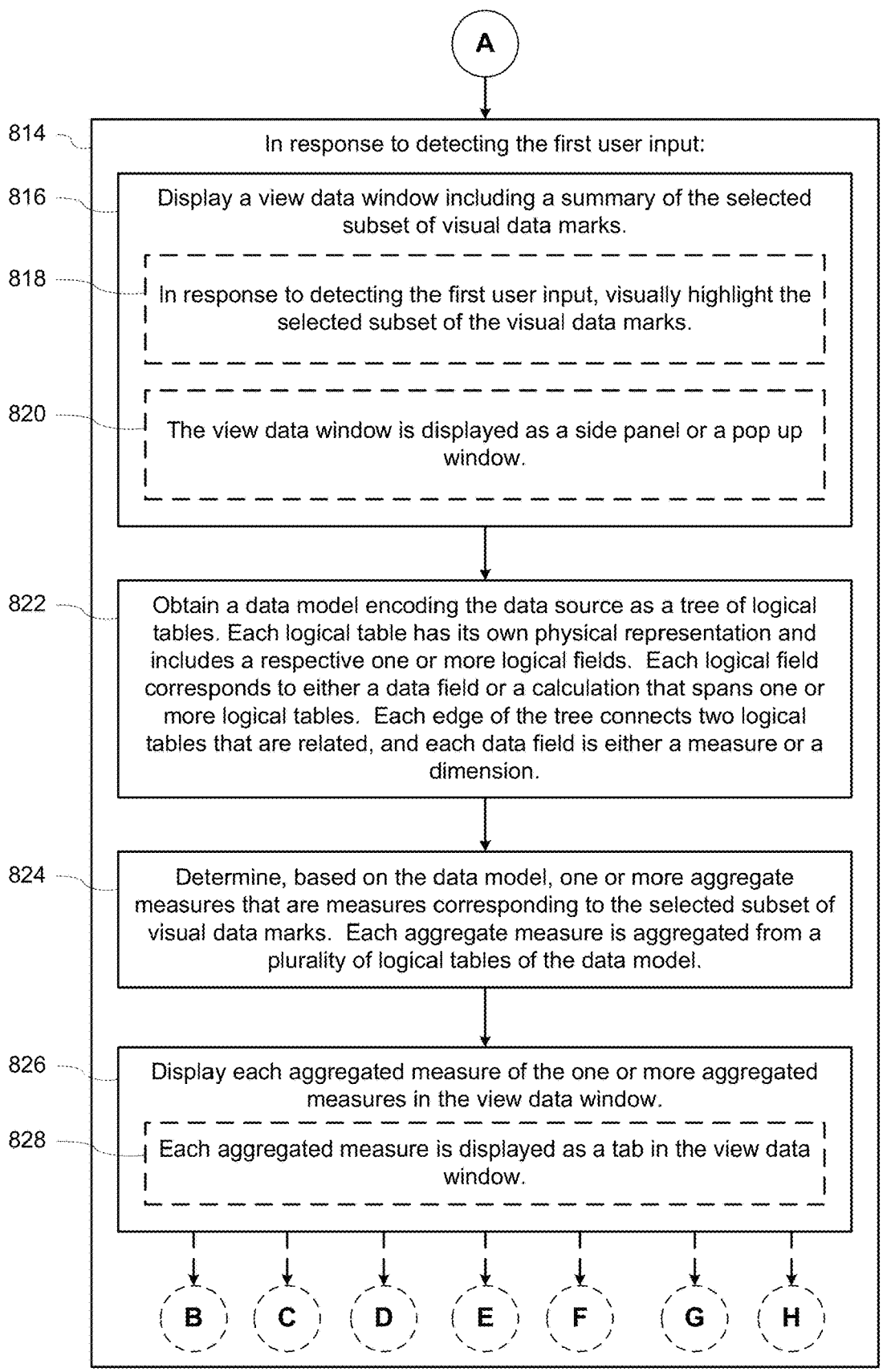

Referring next to FIG. 8B, in response to detecting the first user input, the computer displays (816) a view data window including a summary of the selected subset of visual data marks. In some implementations, in response to detecting the first user input, the computer visually highlights (818) the selected subset of the visual data marks. In some implementations, the computer displays (820) the view data window as a side panel or a pop up window.

The computer also obtains (822) a data model encoding the data source as a tree of logical tables. Each logical table has its own physical representation and includes a respective one or more logical fields. Each logical field corresponds to either a data field or a calculation that spans one or more logical tables. Each edge of the tree connects two logical tables that are related, and each data field is either a measure or a dimension. The computer also determines (824), based on the data model, one or more aggregate measures that are measures corresponding to the selected subset of visual data marks. Each aggregate measure is aggregated from a plurality of logical tables of the data model. The computer displays (826) each aggregate measure of the one or more aggregate measures in the view data window. In some implementations, each aggregate measure is displayed (828) as a tab in the view data window.

Figure 8C:
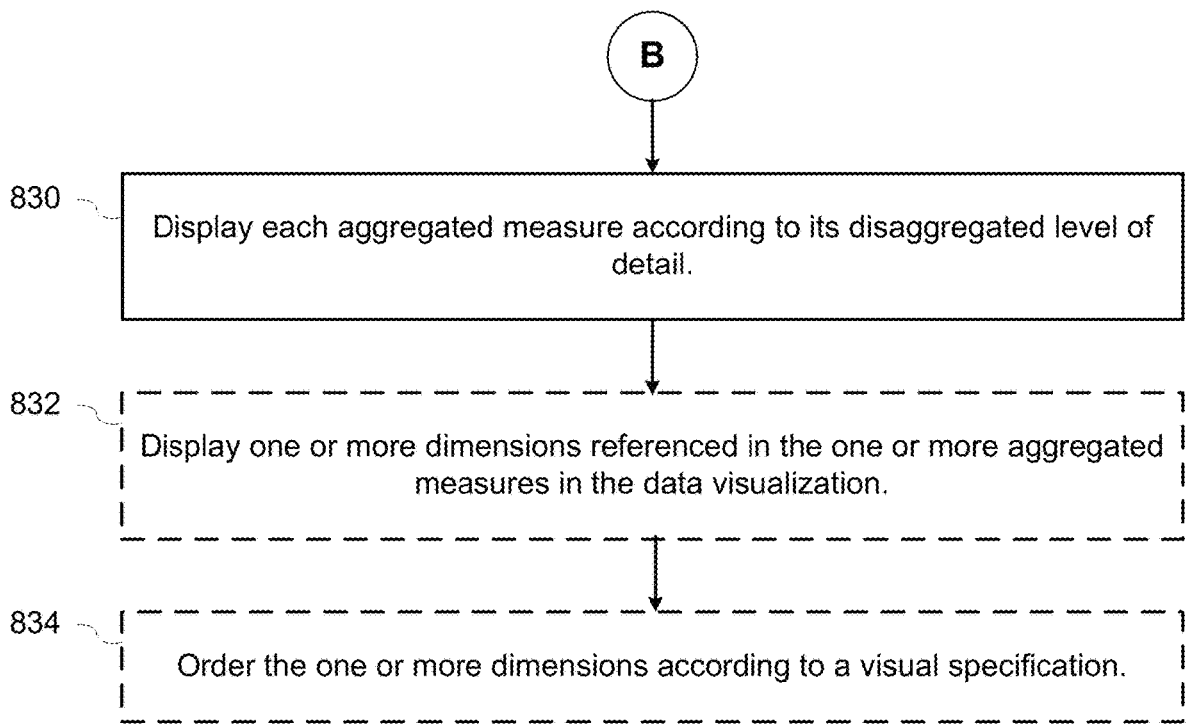

Referring next to FIG. 8C, in some implementations, the computer also displays (830) each aggregate measure according to its disaggregated level of detail. In some implementations, the computer also displays (832) one or more dimensions referenced in the one or more aggregate measures in the data visualization. In some implementations, the computer orders (834) the one or more dimensions according to a visual specification.

Figure 8D:
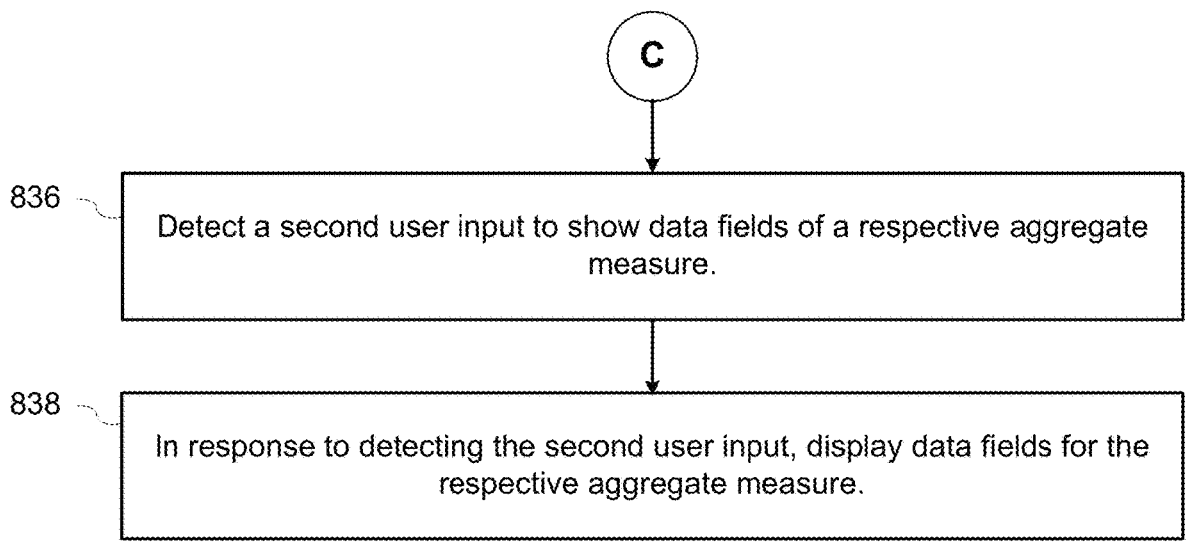

Referring next to FIG. 8D, in some implementations, the computer also detects (836) a second user input to show data fields of a respective aggregate measure. In response to detecting the second user input, the computer displays (838) data fields for the respective aggregate measure.

Referring next to FIG. 8E, in some implementations, in accordance with a determination that a plurality of aggregate measures is aggregated from a same set of logical tables, the computer displays (840) a single instance of the plurality of aggregate measures in the view data window.

Referring next to FIG. 8F, in some implementations, in accordance with a determination that a plurality of aggregate measures is aggregated from a first logical table, the computer performs (842) at least the following operations: (i) ceasing to display the plurality of aggregate measures, and (ii) displaying the first logical table, in the view data window.

Referring next to FIG. 8G, in some implementations, the computer displays (844), in the view data window, dimensions and calculations referenced in the selected subset of visual data marks. In some implementations, the computer also displays (846), in the view data window, one or more measures for each calculation referenced in the selected subset of visual data marks.

Figure 8H:
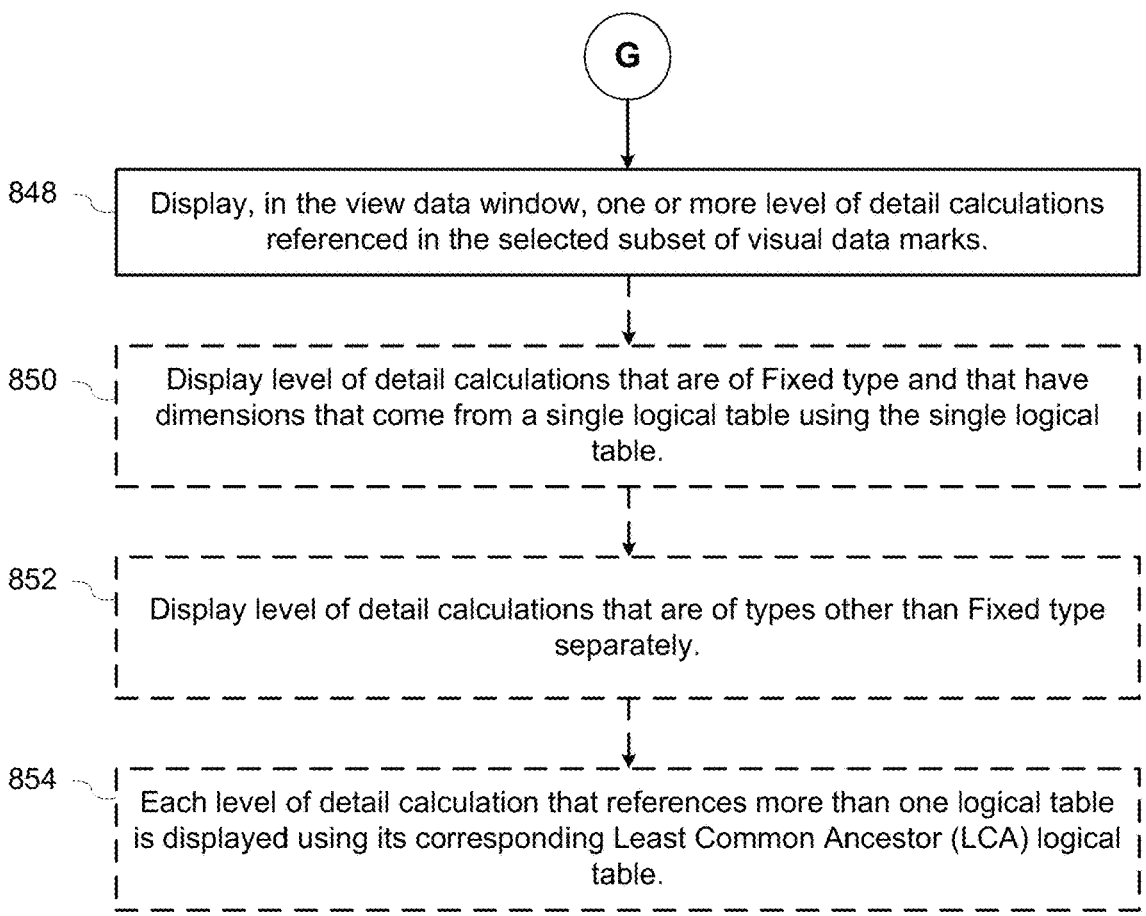

Referring next to FIG. 8H, in some implementations, the computer displays (848), in the view data window, one or more level of detail calculations referenced in the selected subset of visual data marks. In some implementations, the computer displays (850) level of detail calculations that have Fixed calculation types and that have dimensions that come from a single logical table using the single logical table. In some implementations, the computer displays (852) level of detail calculations that have calculation types other than Fixed separately. In some implementations, each level of detail calculation that references more than one logical table is displayed (854) using a corresponding Least Common Ancestor (LCA) logical table.

Figure 8I:
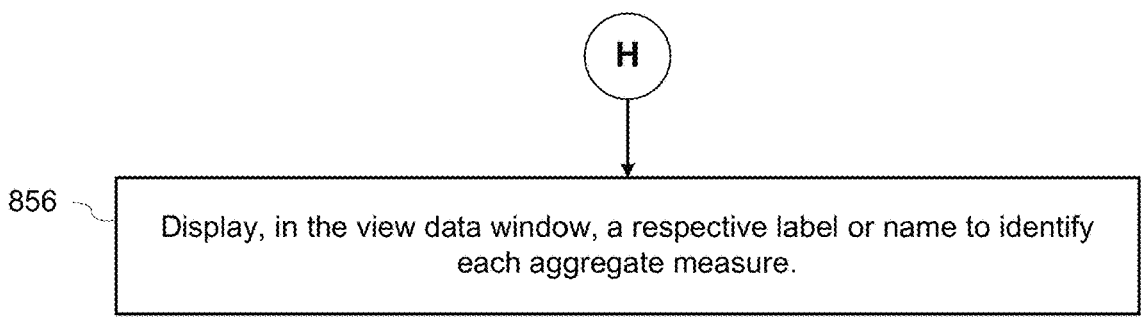

Referring next to FIG. 8I, in some implementations, the computer displays (856), in the view data window, a respective label or a name to identify each aggregate measure.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of visually analyzing multi-row calculations for data visualizations, comprising:
    at a computer having a display, one or more processors, and memory storing one or more programs configured for execution by the one or more processors:
    receiving user selection of a data source;
    displaying a data visualization in a data visualization user interface, according to placement of data fields, from the data source, in shelves of the user interface, wherein the data visualization comprises a plurality of visual data marks representing data from the data source;
    detecting a first user input to select a subset of the visual data marks;
    in response to detecting the first user input:
        displaying a view data window including a summary of the selected subset of visual data marks;
        obtaining a data model encoding the data source as a tree of logical tables, each logical table having its own physical representation and including a respective one or more logical fields, each logical field corresponding to either a data field or a calculation that spans one or more logical tables, wherein each edge of the tree connects two logical tables that are related, and each data field is either a measure or a dimension;
        determining, based on the data model, one or more aggregate measures corresponding to the selected subset of visual data marks, wherein each aggregate measure is aggregated from a plurality of logical tables of the data model; and
        displaying each aggregate measure of the one or more aggregate measures in the view data window, each aggregate measure displayed as a tab in the view data window.

2. The method of claim 1, further comprising, in response to detecting the first user input, visually highlighting the selected subset of the visual data marks.

3. The method of claim 1, wherein the view data window is displayed as a side panel or a pop up window.

4. The method of claim 1, further comprising displaying each aggregate measure according to its disaggregated level of detail.

5. The method of claim 4, further comprising displaying one or more dimensions referenced in the one or more aggregate measures in the data visualization.

6. The method of claim 5, further comprising ordering the one or more dimensions according to a visual specification.

7. The method of claim 1, further comprising:
    detecting a second user input to show data fields of a respective aggregate measure; and
    in response to detecting the second user input, displaying data fields for the respective aggregate measure.

8. The method of claim 1, further comprising, in accordance with a determination that a plurality of aggregate measures is aggregated from a same set of logical tables, displaying a single instance of the plurality of aggregate measures in the view data window.

9. The method of claim 1, further comprising, in accordance with a determination that a plurality of aggregate measures is aggregated from a first logical table: (i) ceasing to display the plurality of aggregate measures, and (ii) displaying the first logical table, in the view data window.

10. The method of claim 1, further comprising displaying, in the view data window, dimensions and calculations referenced in the selected subset of visual data marks.

11. The method of claim 10, further comprising displaying, in the view data window, one or more measures for each calculation referenced in the selected subset of visual data marks.

12. The method of claim 1, further comprising displaying, in the view data window, one or more level of detail calculations referenced in the selected subset of visual data marks.

13. The method of claim 12, wherein:
level of detail calculations that have Fixed calculation types and that have dimensions that come from a single logical table are displayed using the single logical table; and
level of detail calculations that have calculation types other than Fixed are displayed separately.

14. The method of claim 12, wherein each level of detail calculation that references more than one logical table is displayed using its corresponding Least Common Ancestor (LCA) logical table.

15. The method of claim 1, further comprising displaying, in the view data window, a respective label or a name to identify each aggregate measure.

16. A computer system for displaying object models for data sources, comprising:
a display;
one or more processors; and
memory;
wherein the memory stores one or more programs configured for execution by the one or more processors, and the one or more programs comprise instructions for:
receiving user selection of a data source;
displaying a data visualization in a data visualization user interface, according to placement of data fields, from the data source, in shelves of the user interface, wherein the data visualization comprises a plurality of visual data marks representing data from the data source;
detecting a first user input to select a subset of the visual data marks;
in response to detecting the first user input:
displaying a view data window including a summary of the selected subset of visual data marks;
obtaining a data model encoding the data source as a tree of logical tables, each logical table having its own physical representation and including a respective one or more logical fields, each logical field corresponding to either a data field or a calculation that spans one or more logical tables, wherein each edge of the tree connects two logical tables that are related, and each data field is either a measure or a dimension;
determining, based on the data model, one or more aggregate measures that are measures corresponding to the selected subset of visual data marks, wherein each aggregate measure is aggregated from a plurality of logical tables of the data model;
displaying each aggregate measure of the one or more aggregate measures in the view data window; and
in accordance with a determination that a plurality of aggregate measures is aggregated from a same set of logical tables, displaying a single instance of the plurality of aggregate measures in the view data window.

17. The computer system of claim 16, wherein the one or more programs further comprise instructions for displaying each aggregate measure according to its disaggregated level of detail.

18. The computer system of claim 17, wherein the one or more programs further comprise instructions for displaying one or more dimensions referenced in the one or more aggregate measures in the data visualization.

19. A non-transitory computer readable storage medium storing one or more programs configured for execution by a computer system having a display, one or more processors, and memory, the one or more programs comprising instructions for:
receiving user selection of a data source;
displaying a data visualization in a data visualization user interface, according to placement of data fields, from the data source, in shelves of the user interface, wherein the data visualization comprises a plurality of visual data marks representing data from the data source;
detecting a first user input to select a subset of the visual data marks;
in response to detecting the first user input:
displaying a view data window including a summary of the selected subset of visual data marks;
obtaining a data model encoding the data source as a tree of logical tables, each logical table having its own physical representation and including a respective one or more logical fields, each logical field corresponding to either a data field or a calculation that spans one or more logical tables, wherein each edge of the tree connects two logical tables that are related, and each data field is either a measure or a dimension;
determining, based on the data model, one or more aggregate measures corresponding to the selected subset of visual data marks, wherein each aggregate measure is aggregated from a plurality of logical tables of the data model;
displaying each aggregate measure of the one or more aggregate measures in the view data window; and
in accordance with a determination that a plurality of aggregate measures is aggregated from a first logical table: (i) ceasing to display the plurality of aggregate measures, and (ii) displaying the first logical table, in the view data window.

20. The non-transitory computer readable storage medium of claim 19, wherein each aggregate measure is displayed as a tab in the view data window.

* * * * *